(12) United States Patent
Arora et al.

(10) Patent No.: US 11,880,307 B2
(45) Date of Patent: Jan. 23, 2024

(54) SYSTEMS AND METHODS FOR DYNAMIC MANAGEMENT OF STORED CACHE DATA BASED ON PREDICTIVE USAGE INFORMATION

(71) Applicant: BANK OF AMERICA CORPORATION, Charlotte, NC (US)

(72) Inventors: Saurabh Arora, Gurugram (IN); Sandeep Kumar Chauhan, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/849,635

(22) Filed: Jun. 25, 2022

(65) Prior Publication Data

US 2023/0418751 A1    Dec. 28, 2023

(51) Int. Cl.
*G06F 12/00* (2006.01)
*G06F 12/0862* (2016.01)
*G06F 12/0811* (2016.01)
*G06F 12/0888* (2016.01)

(52) U.S. Cl.
CPC ...... *G06F 12/0862* (2013.01); *G06F 12/0811* (2013.01); *G06F 12/0888* (2013.01); *G06F 2212/1024* (2013.01)

(58) Field of Classification Search
CPC ............. G06F 12/0862; G06F 12/0811; G06F 12/0888; G06F 12/0802; G06F 2212/1024; G06F 2212/30; G06F 2212/31; G06F 2212/60; H04L 67/2847
See application file for complete search history.

(56) References Cited

U.S. PATENT DOCUMENTS

| | | | |
|---|---|---|---|
| 5,802,292 | A | 9/1998 | Mogul |
| 6,003,114 | A | 12/1999 | Bachmat |
| 6,085,193 | A | 7/2000 | Malkin et al. |
| 6,128,701 | A | 10/2000 | Malcolm et al. |
| 6,272,598 | B1 | 8/2001 | Arlitt et al. |
| 6,766,422 | B2 | 7/2004 | Beyda |
| 6,813,501 | B2 | 11/2004 | Kinnunen et al. |
| 7,054,917 | B1 | 5/2006 | Kirsch et al. |
| 7,454,393 | B2 | 11/2008 | Horvitz et al. |
| 8,112,409 | B2 | 2/2012 | Shen et al. |

(Continued)

*Primary Examiner* — Shawn X Gu
(74) *Attorney, Agent, or Firm* — Moore & Van Allen PLLC; Vaidehi Bachoti

(57) ABSTRACT

Embodiments of the invention are directed to systems, methods and computer program products structured for dynamic management of stored cache data based on predictive usage information. The invention is structured for proactive alleviation of obsolete data, dynamic pre-population and fetching of cached data based on determining actions preceding initiation of activities. Specifically, the invention is configured to detect, via a proactive processor application, a first access event via a first network device associated with a first communication channel at a first time interval, such that the first access event is detected prior to initiation of a first technology activity event by the user. The invention is also structured to populate the first adapted hierarchical cache data object for use at a technology application associated with the first network device prior to the initiation of the first technology activity event by the user.

20 Claims, 7 Drawing Sheets

(56) References Cited

U.S. PATENT DOCUMENTS

| | | |
|---|---|---|
| 8,364,611 B2 | 1/2013 | Tendjoukian et al. |
| 8,688,453 B1 | 4/2014 | Joshi et al. |
| 8,793,706 B2 | 7/2014 | Villadsen et al. |
| 8,886,576 B1 | 11/2014 | Sanketi et al. |
| 9,015,081 B2 | 4/2015 | Horvitz et al. |
| 9,047,235 B1 | 6/2015 | Barraclough et al. |
| 10,684,950 B2 | 6/2020 | Chauhan et al. |
| 11,265,396 B1 * | 3/2022 | Chauhan ............ G06F 12/0802 |
| 2003/0187960 A1 | 10/2003 | Koba et al. |
| 2005/0005007 A1 | 1/2005 | Keohane et al. |
| 2005/0060498 A1 | 3/2005 | Curtis |
| 2006/0106784 A1 | 5/2006 | Alpha |
| 2007/0067293 A1 | 3/2007 | Yu |
| 2009/0056525 A1 | 3/2009 | Oppenheimber |
| 2009/0063646 A1 | 3/2009 | Mitnick |
| 2009/0328087 A1 | 12/2009 | Higgins et al. |
| 2010/0070554 A1 | 3/2010 | Richardson et al. |
| 2012/0198020 A1 | 8/2012 | Parker et al. |
| 2012/0259821 A1 | 10/2012 | Alam |
| 2015/0095587 A1 | 4/2015 | Xu et al. |
| 2015/0363105 A1 | 12/2015 | Nakao et al. |
| 2016/0021164 A1 | 1/2016 | Chakarapani et al. |
| 2016/0337792 A1 | 11/2016 | Bhavsar et al. |
| 2017/0041267 A1 | 2/2017 | Walkin et al. |
| 2017/0242895 A1 | 8/2017 | Kephart et al. |
| 2020/0177469 A1 | 6/2020 | Kercheville et al. |

* cited by examiner

SYSTEMS AND METHODS FOR DYNAMIC MANAGEMENT OF STORED CACHE DATA BASED ON PREDICTIVE USAGE INFORMATION

FIELD OF THE INVENTION

The present invention generally relates to dynamic and adapted management of stored cache data based on predictive usage information. Embodiments of the invention are structured for light-weight granular data caching based on construction of adapted hierarchical data objects with improved indexing, as well as dynamic pre-population and fetching of cached data based on determining actions preceding initiation of activities.

BACKGROUND

There has been a significant increase in the number of electronic activities, particularly online and mobile activities due to widespread use of smartphone, tablet computers, laptop computers, transaction terminals, and electronic computing devices in general. Performing electronic activities requires the devices to repeatedly fetch relevant data from backend servers, external databases/networks, and/or other backend systems/devices. However, fetching data from backend systems results in a time lag, causing delays in execution of the electronic activities. Some conventional systems employ data caching, in an attempt to reduce these delays. However, these conventional systems typically cache almost all provided data commencing since the time of the users' login, in its entirety. Conventional systems are neither able to determine the relevancy of the data for current activities, much less for future activities, nor envisage how long the data needs to be cached for, thereby resulting in large amounts of irrelevant cached data that is stored over extended time periods. However, caching such immense amounts of data causes severe burdens on data caching servers, such as heavy memory and processing loads. Moreover, the enormity of the amounts of the data being cached results in slow turnaround times for the searching and fetching relevant data, thereby impeding the very purpose of data caching. In addition, typically, the data cached by conventional systems is specific to a particular device, and conventional systems are not able to transform cached data across channels, causing further delays.

The present invention provides a novel dynamic management of stored cache data, that alleviates the above deficiencies and also provides other advantages. The previous discussion of the background to the invention is provided for illustrative purposes only and is not an acknowledgement or admission that any of the material referred to is or was part of the common general knowledge as at the priority date of the application.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing systems, computer program products and methods for dynamic management of stored cache data based on usage information. Typically, the system is structured for light-weight granular data caching based on construction of adapted hierarchical data objects with improved indexing, for reducing memory and processing burdens on data caching servers and reducing turnaround time for activity execution. In some instances, the system comprises: at least one memory device with computer-readable program code stored thereon, at least one communication device, at least one processing device operatively coupled to the at least one memory device and the at least one communication device, wherein executing the computer-readable program code is typically configured to cause the at least one processing device to perform, execute or implement one or more features or steps of the invention such as: initiate, via a proactive processor application, a technology usage analysis mechanism comprising technology usage data associated with a plurality of users; construct, via the proactive processor application, an adapted truncated cache data retrieval command such that the truncated cache data retrieval command is structured to selectively retrieve data that matches the technology usage data; trigger, via the proactive processor, retrieval of truncated technology data for caching from a usage database based on the adapted truncated cache data retrieval command; construct a plurality of adapted hierarchical cache data objects, for each of the plurality of users, in a distributed cache layer, comprising: identifying a plurality of data element types in the retrieved truncated technology data based on parsing the retrieved truncated technology data; splitting the retrieved truncated technology data into a plurality of cache data objects such that each of the plurality of cache data objects comprises an associated data element type; determining a hierarchy of each of the plurality of cache data objects; and transforming the plurality of cache data objects into the plurality of adapted hierarchical cache data objects based on the determined hierarchy, wherein each of the adapted hierarchical cache data objects are (i) mapped to an associated cache data object identifier, and (ii) linked to a parent user identifier data element; and cache the constructed plurality of adapted hierarchical cache data objects, for each of the plurality of users, in the distributed cache layer.

In some embodiments, or in combination with any of the previous embodiments, the invention is structured to: detect, via a proactive processor application, a first access event via a first network device associated with a first communication channel at a first time interval, such that the first access event is detected prior to initiation of a first technology activity event by the user; and populate a first adapted hierarchical cache data object of the constructed plurality of adapted hierarchical cache data objects for use at a technology application associated with the first network device prior to the initiation of the first technology activity event by the user.

In some embodiments, or in combination with any of the previous embodiments, initiating the technology usage analysis mechanism further comprises: retrieving, via a usage monitor engine application, metadata associated with prior technology usage events associated with the plurality of users, wherein the prior technology usage events comprise a user activity log associated with activities initiated by the plurality of users using one or more network devices associated with one or more communication channels.

In some embodiments, or in combination with any of the previous embodiments, constructing the adapted truncated cache data retrieval command further comprises: analyzing the metadata associated with the prior technology usage events associated with the plurality of users; constructing, for each of the plurality of users, at least one user access routine based on determining one or more usage patterns in the metadata associated with the prior technology usage events, wherein determining one or more usage patterns further comprises determining a match between metadata associated with a first prior technology usage event at a first time interval, and metadata associated with a prior second technology usage event at a second time interval succeeding the first time interval, wherein the at least one user access routine comprises one or more user activity events based on the one user access routine; determining, for each of the plurality of users, (i) one or more event attributes associated with each of the one or more user activity events in the associated at least one user access routine, and (ii) compatible cache data objects associated with the one or more event attributes; and constructing, for each of the plurality of users, the adapted truncated cache data retrieval command to retrieve the compatible cache data objects associated with the one or more event attributes associated with the at least one user access routine.

In some embodiments, or in combination with any of the previous embodiments, determining one or more usage patterns further comprises: determining a match between metadata associated with a first sequence of prior technology usage events at a third time interval, and metadata associated with a second sequence of prior technology usages event at a fourth time interval succeeding the third time interval.

In some embodiments, or in combination with any of the previous embodiments, the invention is structured to: construct one or more additional child cache data objects; and append the plurality of adapted hierarchical cache data objects with the one or more additional child cache data objects.

In some embodiments, or in combination with any of the previous embodiments, the invention is structured to: for each of the plurality of adapted hierarchical cache data objects of each of the plurality of users, determine an associated determine a time to live parameter; and link the determined time to live parameter to the associated adapted hierarchical cache data object such that the adapted hierarchical cache data object is (i) stored only for a first time interval associated with the duration of the time to live parameter, and (ii) dynamically expunged upon elapse of the first time interval associated with the time to live parameter.

In some embodiments, or in combination with any of the previous embodiments, the plurality of adapted hierarchical cache data objects associated with a first user comprise a first adapted hierarchical cache data object and a second adapted hierarchical cache data object of the plurality of adapted hierarchical cache data objects. Here, determining the associated time to live parameter further comprises: determining a first time to live parameter associated with the first adapted hierarchical cache data object of the first user; and determining a second time to live parameter associated with the second adapted hierarchical cache data object of the first user; and wherein the first time to live parameter exceeds the second time to live parameter such that the second adapted hierarchical cache data object is dynamically expunged prior to the dynamic expunging of the first adapted hierarchical cache data object.

In some embodiments, or in combination with any of the previous embodiments, the plurality of adapted hierarchical cache data objects comprise a first adapted hierarchical cache data object associated with a first user, and a second adapted hierarchical cache data object associated with a second user, wherein the first adapted hierarchical cache data object matches the second adapted hierarchical cache data object. Here, determining the associated time to live parameter further comprises: determining a first time to live parameter associated with the first adapted hierarchical cache data object of the first user; and determining a second time to live parameter associated with the second adapted hierarchical cache data object of the second user; and wherein the first time to live parameter exceeds the second time to live parameter such that the second adapted hierarchical cache data object is dynamically expunged prior to the dynamic expunging of the first adapted hierarchical cache data object.

In some embodiments, or in combination with any of the previous embodiments, determining the associated time to live parameter further comprises: for a first adapted hierarchical cache data object of the plurality of adapted hierarchical cache data objects of a first user of the plurality of users, determining an associated first storage level location and a second storage level location; and determining a first time to live parameter associated with the first storage level location, and determining a second time to live parameter associated with the second storage level location, wherein the first time to live parameter exceeds the second time to live parameter such that the first adapted hierarchical cache data object at the second storage level location is dynamically expunged prior to the dynamic expunging of the first adapted hierarchical cache data object at the first storage level location.

In some embodiments, or in combination with any of the previous embodiments, the invention is structured to: determine an update to a system of records database system; and expunge the plurality of adapted hierarchical cache data objects in real-time, in response to determining the update to a system of records database system.

In some embodiments, or in combination with any of the previous embodiments, the invention is structured to: for each of the plurality of adapted hierarchical cache data objects of each of the plurality of users, determine an associated determine a time to fetch parameter; and link the determined time to fetch parameter to the associated adapted hierarchical cache data object.

In some embodiments, or in combination with any of the previous embodiments, the invention is structured to: for each of the plurality of adapted hierarchical cache data objects of each of the plurality of users, dynamically update the adapted hierarchical cache data object at a time interval preceding the associated determined time to fetch parameter.

Embodiments of the present invention address these and/or other needs by providing systems, computer program products and methods for dynamic management of stored cache data based on predictive usage information. Typically, the system is structured for proactive alleviation of obsolete data, dynamic pre-population and fetching of cached data based on determining actions preceding initiation of activities, for preventing data redundancy based errors, and reducing memory and processing burdens on data caching servers and reducing turnaround time for activity execution. In some instances, the system comprises: at least one memory device with computer-readable program code stored thereon, at least one communication device, at least one processing device operatively coupled to the at least one memory device and the at least one communication device, wherein executing the computer-readable program code is typically configured to cause the at least one processing device to perform, execute or implement one or more features or steps of the invention such as: detect, via a proactive processor application, a first access event via a first network device associated with a first communication channel at a first time interval, such that the first access event is detected prior to initiation of a first technology activity event by the user; determine a proactive technology activity event associated with the user that is (i) compatible with the first network device associated with a first communication channel and (ii) matches the first access event; determine a first adapted hierarchical cache data object of the plurality of adapted hierarchical cache data objects associated with the first user that is compatible with the proactive technology activity event; trigger one or more data presence checks associated with the first adapted hierarchical cache data object at one or more technology network layers; in response to a successful data presence check, selectively retrieve truncated cache data that matches the proactive technology activity event; populate the first adapted hierarchical cache data object for use at a technology application associated with the first network device prior to the initiation of the first technology activity event by the user; detect initiation of the first technology activity event by a user at a second time interval via the first network device associated with the first communication channel; and in response to determining that the first technology activity event matches the proactive technology activity event, initiate the first technology activity event using the first adapted hierarchical cache data object.

In some embodiments, or in combination with any of the previous embodiments, determining proactive technology activity event associated with the user further comprises: determine access attributes associated with the first access event; retrieve, via a usage monitor engine application, metadata associated with prior technology usage events associated with the users; determine a first user access routine based on determining one or more usage patterns in the metadata associated with the prior technology usage events that match the access attributes associated with the first access event; and determine a proactive technology activity event associated with the user that is (i) compatible with the first network device associated with a first communication channel and (ii) matches the first user access routine.

In some embodiments, or in combination with any of the previous embodiments, determining the first adapted hierarchical cache data object of the plurality of adapted hierarchical cache data objects further comprises: determine one or more event attributes associated with the proactive technology activity event; and determine the first adapted hierarchical cache data object of the plurality of adapted hierarchical cache data objects associated with the first user that is compatible with the one or more event attributes of the proactive technology activity event.

In some embodiments, or in combination with any of the previous embodiments, selectively retrieving truncated cache data comprises retrieving truncated cache data that matches one or more event attributes of the proactive technology activity event, further comprising: retrieving the first adapted hierarchical cache data object of the plurality of adapted hierarchical cache data objects associated with the first user that is compatible with the one or more event attributes of the proactive technology activity event.

In some embodiments, or in combination with any of the previous embodiments, the invention is structured to: trigger a first data presence check associated with the first adapted hierarchical cache data object at an application layer associated with the first communication channel.

In some embodiments, or in combination with any of the previous embodiments, the invention is structured to: in response to a successful first data presence check, selectively retrieve truncated cache data that matches the one or more event attributes of the proactive technology activity event, comprising selectively retrieving the first adapted hierarchical cache data object of the plurality of adapted hierarchical cache data objects associated with the first user that is compatible with the one or more event attributes of the proactive technology activity event at a second time interval prior to initiation of the first technology activity event by the user.

In some embodiments, or in combination with any of the previous embodiments, the invention is structured to: in response to an unsuccessful first data presence check, trigger a second data presence check associated with the first adapted hierarchical cache data object at an entity layer associated with the first communication channel.

In some embodiments, or in combination with any of the previous embodiments, the invention is structured to: in response to a successful second data presence check, selectively retrieve truncated cache data that matches the one or more event attributes of the proactive technology activity event, comprising: retrieving the first adapted hierarchical cache data object of the plurality of adapted hierarchical cache data objects associated with the first user that is compatible with the one or more event attributes of the proactive technology activity event prior to initiation of the first technology activity event by the user; and transmitting retrieved the first adapted hierarchical cache data object from the entity layer to the application layer prior to initiation of the first technology activity event by the user.

In some embodiments, or in combination with any of the previous embodiments, selectively retrieving truncated cache data, further comprises: accessing the plurality of adapted hierarchical cache data objects associated with a plurality of users; and indexing the plurality of adapted hierarchical cache data objects associated with a plurality of users based on a parent user identifier data element associated with the first user.

In some embodiments, or in combination with any of the previous embodiments, populate the first adapted hierarchical cache data object for use at a technology application associated with the first network device prior to the initiation of the first technology activity event by the user, further comprises: determine a time latency associated with the proactive technology activity event, wherein determining the time latency comprises determining a time to fetch parameter associated with the first adapted hierarchical cache data object; proactively extract, via a data caching application, the first adapted hierarchical cache data object at a predetermined first time interval preceding a second time associated with initiation of the second technology activity event, wherein the predetermined first time interval is associated with the determined time to fetch parameter associated with the time latency of the first technology activity event.

In some embodiments, or in combination with any of the previous embodiments, the invention is structured to: determine an update to a system of records database system; and expunge the plurality of adapted hierarchical cache data objects in real-time, in response to determining the update to a system of records database system.

In some embodiments, or in combination with any of the previous embodiments, the invention is structured to: for each of the plurality of adapted hierarchical cache data objects of each of the plurality of users, dynamically update the adapted hierarchical cache data object at a time interval preceding the associated determined time to fetch parameter.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
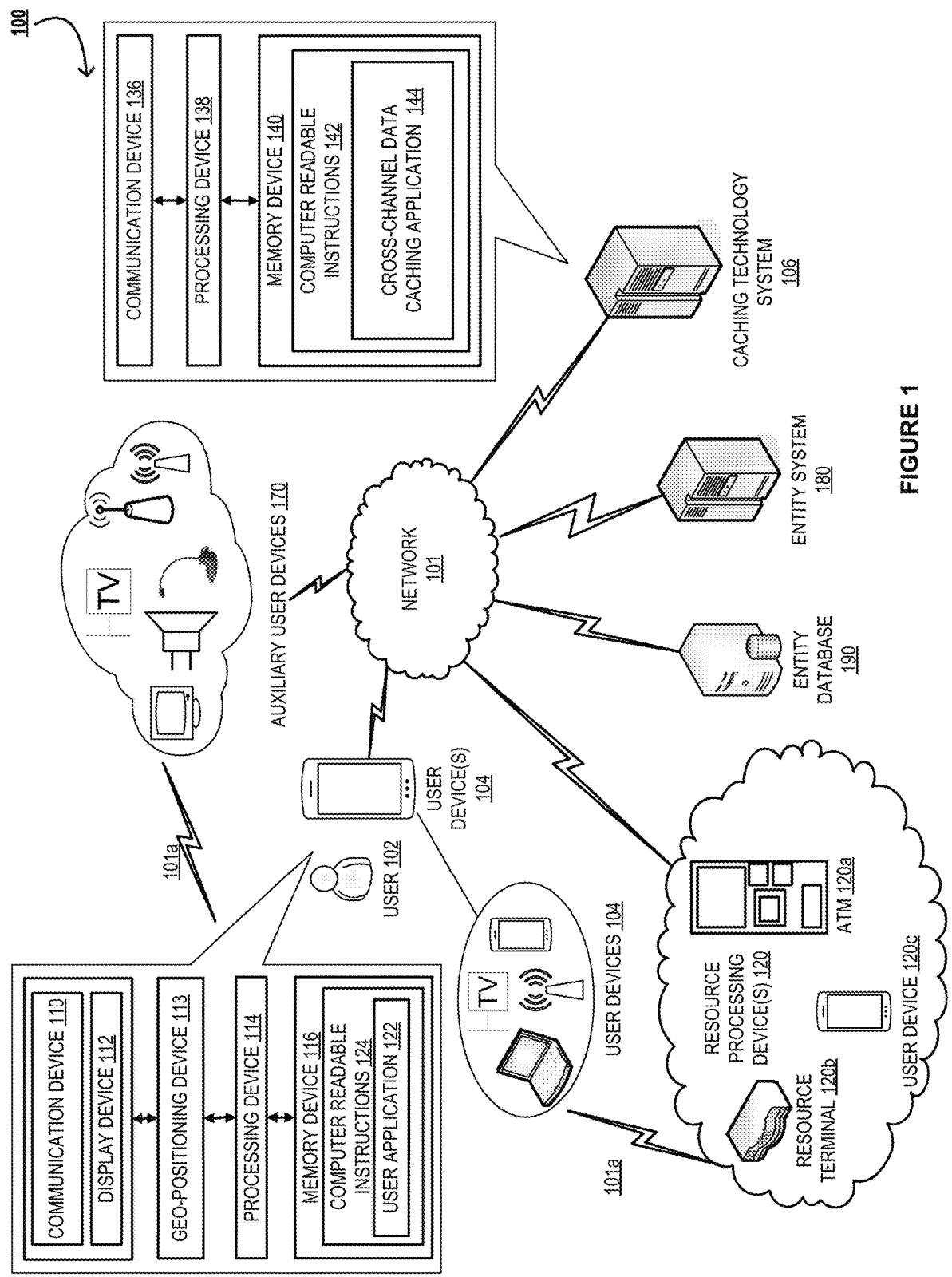
Figure 2A:
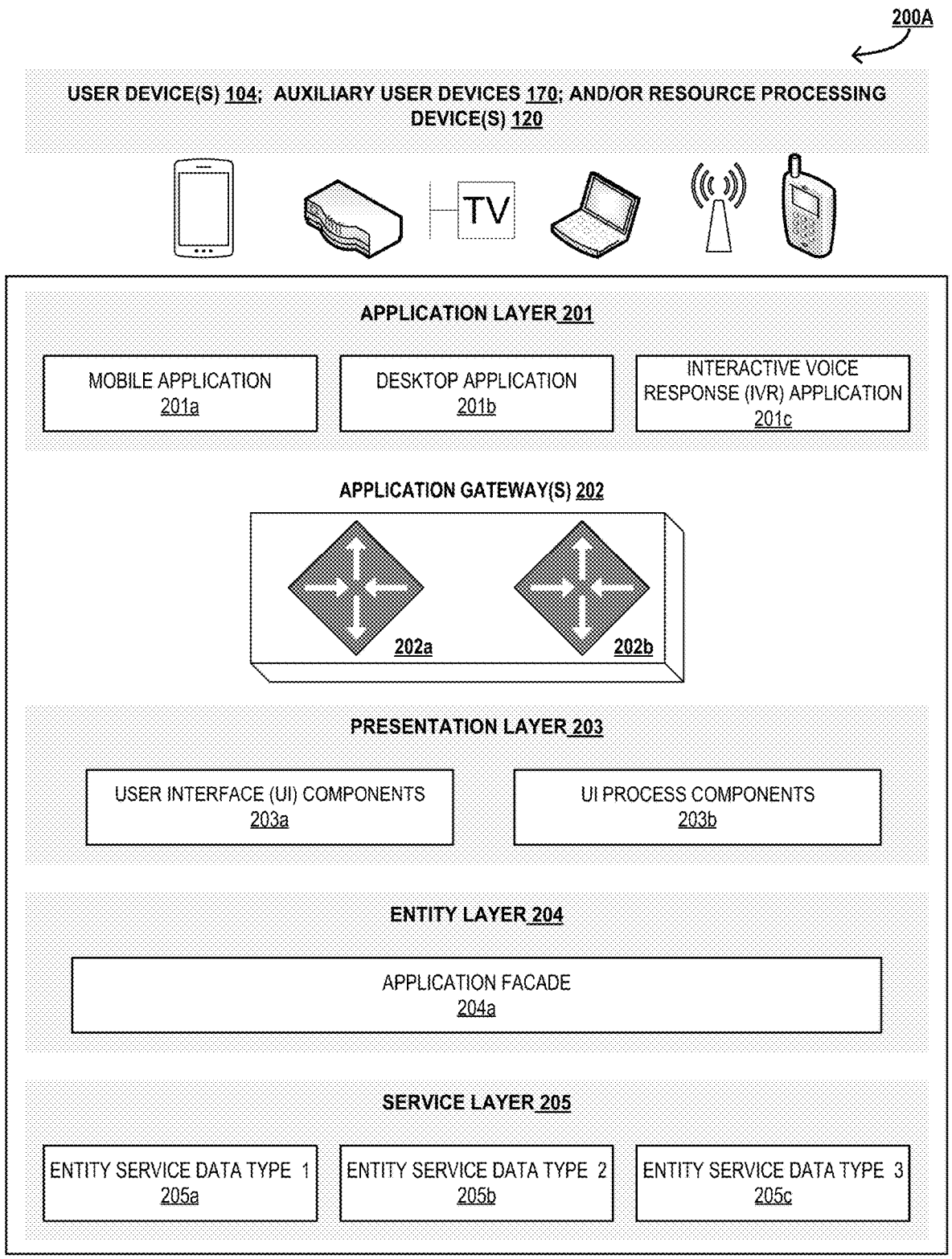
Figure 2B:
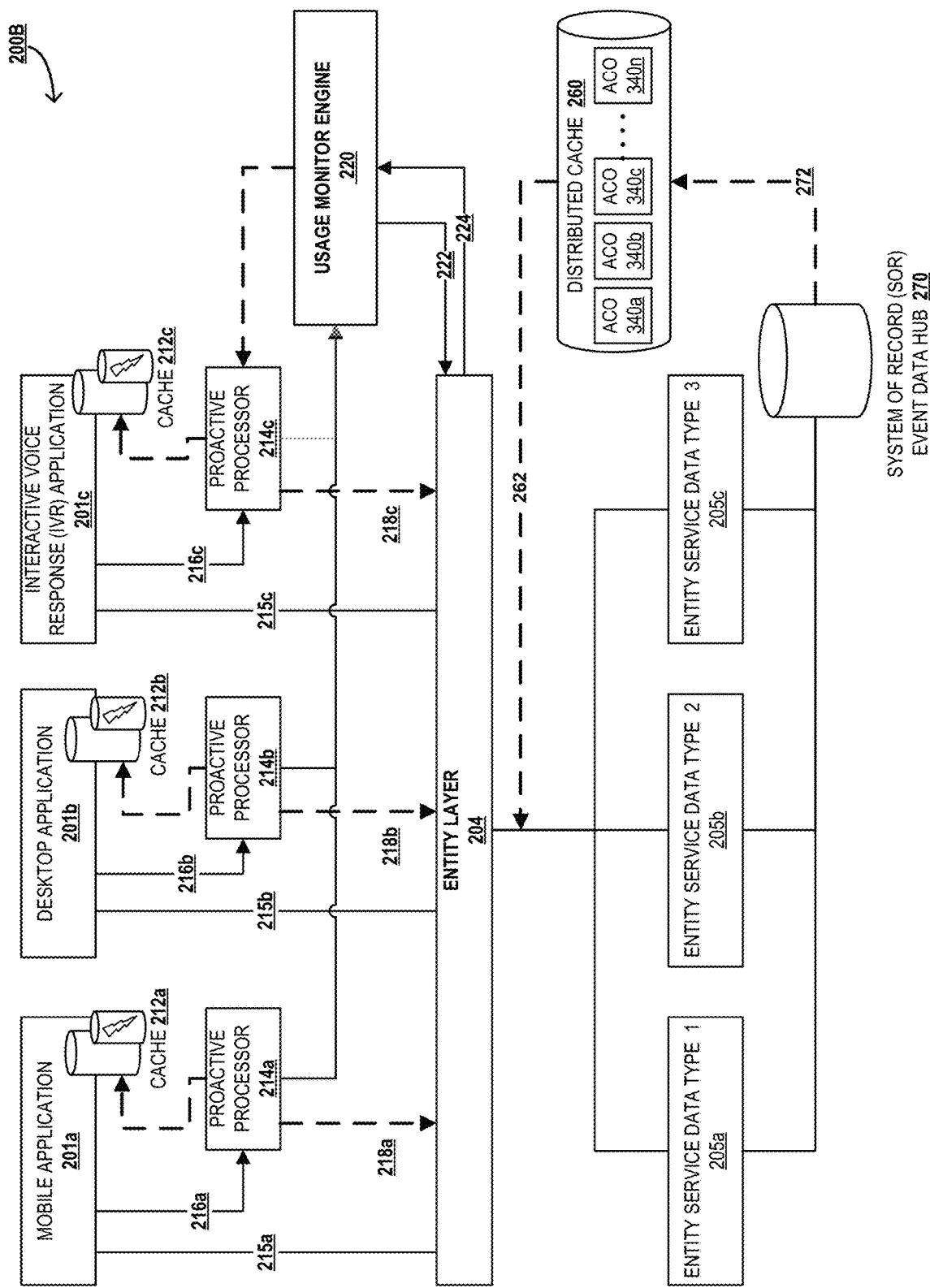
Figure 3A:
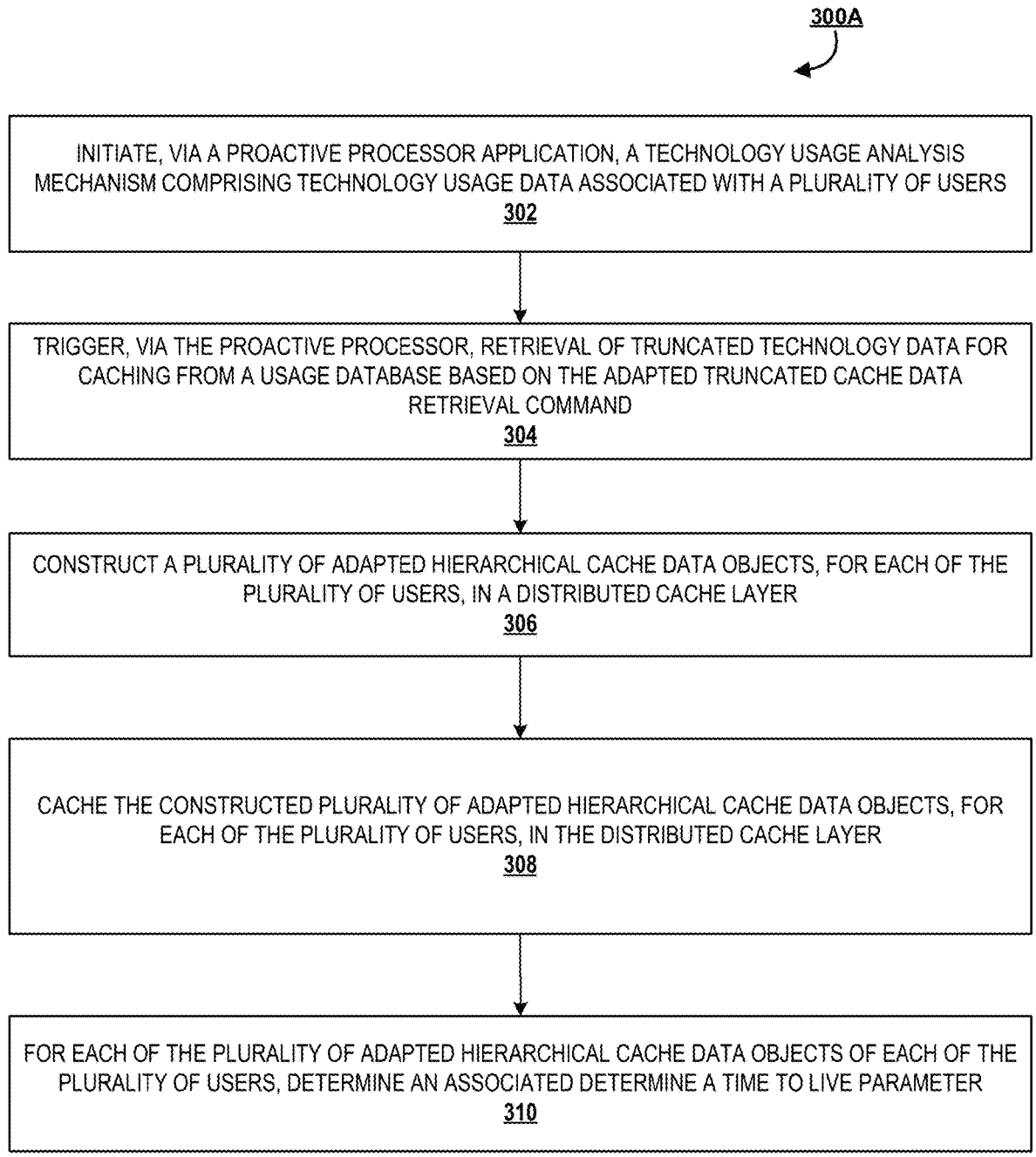
Figure 3B:
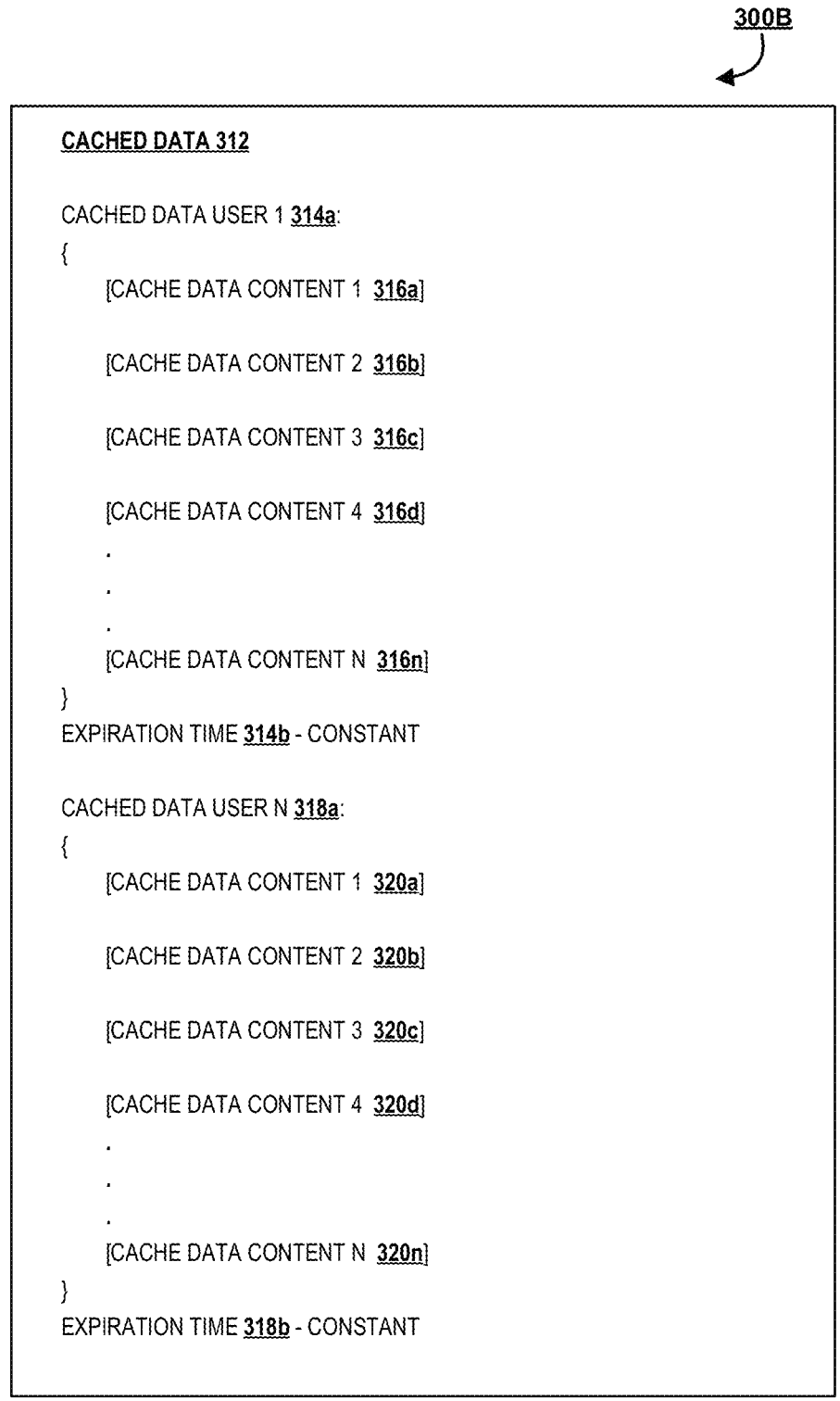
Figure 3C:
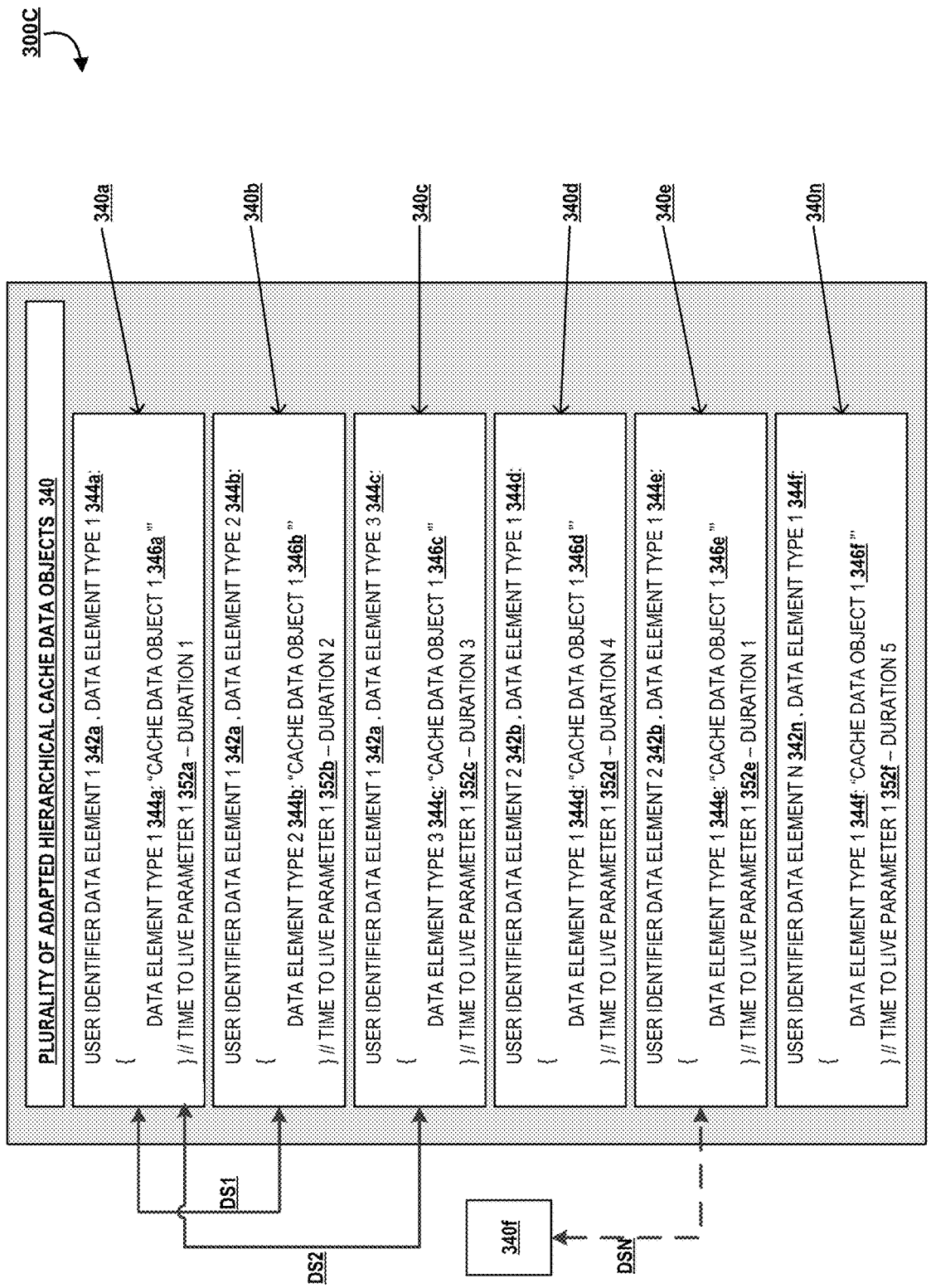
Figure 4:
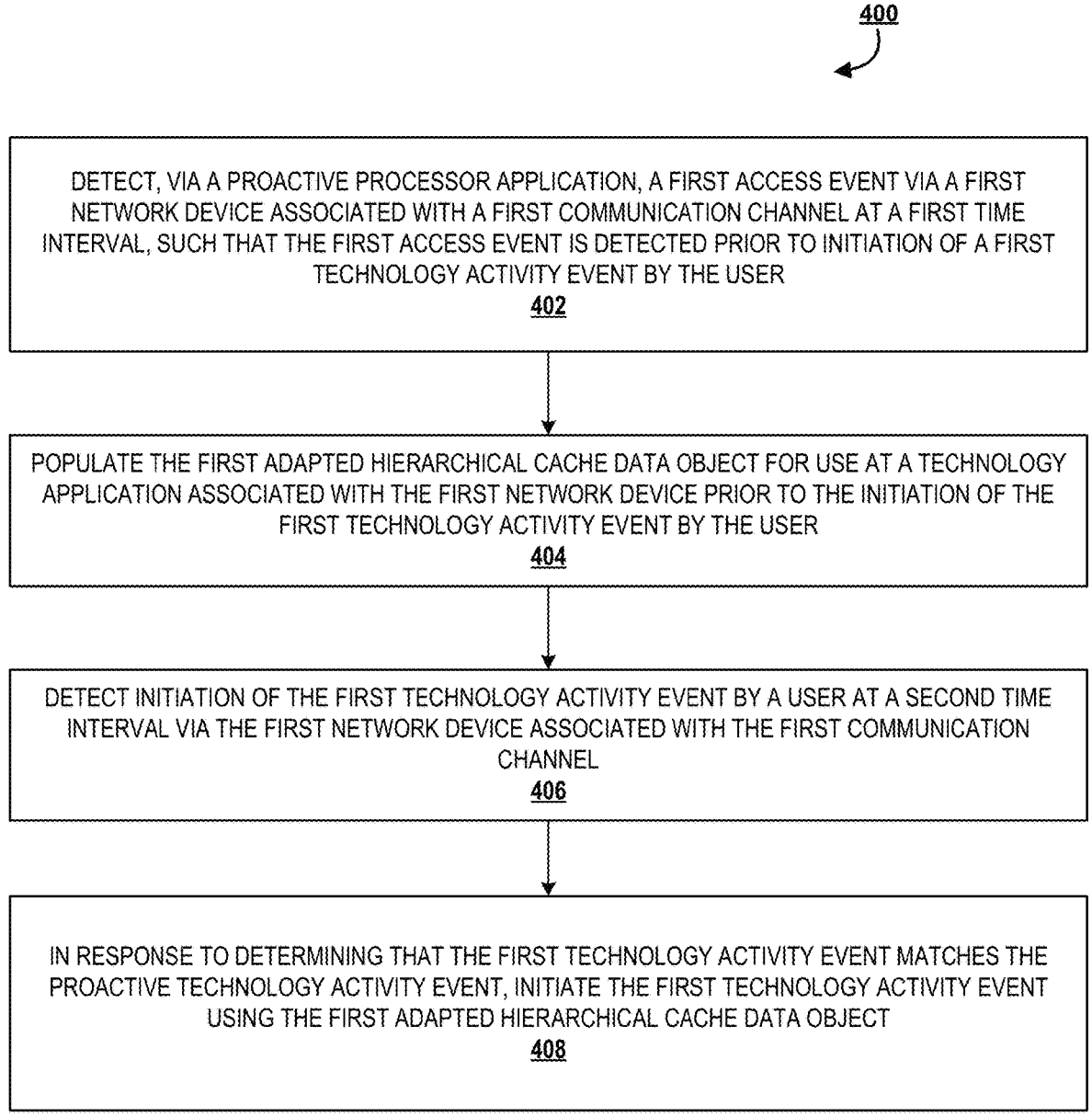

Having thus described embodiments of the invention in general terms, reference will now be made to the accompanying drawings, wherein:

FIG. 1 depicts a network environment 100 for dynamic management of stored cache data, in accordance with one embodiment of the present invention;

FIG. 2A depicts a schematic representation 200A of a network layer environment for dynamic management of stored cache data, in accordance with one embodiment of the present invention;

FIG. 2B depicts a schematic representation 200B of a network processing environment for dynamic management of stored cache data, in accordance with one embodiment of the present invention;

FIG. 3A depicts a high level process flow 300A for dynamic management of stored cache data by construction of adapted hierarchical cache data objects, in accordance with one embodiment of the present invention;

FIG. 3B depicts a schematic representation 300B of cached data;

FIG. 3C depicts a schematic representation 300C of adapted hierarchical cache data objects, in accordance with one embodiment of the present invention; and FIG. 4 depicts a high level process flow 400 for dynamic management of stored cache data by pre-population of cache data based on predictive usage information, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" or "enterprise" as used herein may be any institution or establishment, associated with a network connected resource transfer platform, and particularly geolocation systems and devices. As such, the entity may be any institution, group, association, financial institution, merchant, establishment, company, union, authority or the like.

As described herein, a "user" is an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

In the instances where the entity is a resource entity or a merchant, financial institution and the like, a user may be an individual or entity with one or more relationships, affiliations or accounts with the entity (for example, the merchant, the financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, user information, or the like. The technology resource or account is typically associated with and/or maintained by an entity, and is typically associated with technology infrastructure such that the resource or account may be accessed, modified or acted upon by the user electronically, for example using or transaction terminals, user devices, merchant systems, and the like. In some embodiments, the entity may provide one or more technology instruments or financial instruments to the user for executing resource transfer activities or financial transactions. In some embodiments, the technology instruments/financial instruments like electronic tokens, credit cards, debit cards, checks, loyalty cards, entity user device applications, account identifiers, routing numbers, passcodes and the like are associated with one or more resources or accounts of the user. In some embodiments, an entity may be any institution, group, association, club, establishment, company, union, authority or the like with which a user may have a relationship. As discussed, in some embodiments, the entity represents a vendor or a merchant with whom the user engages in financial (for example, resource transfers like purchases, payments, returns, enrolling in merchant accounts and the like) or non-financial transactions (for resource transfers associated with loyalty programs and the like), either online or in physical stores.

As used herein, a "user interface" may be a graphical user interface that facilitates communication using one or more communication mediums such as tactile communication (such, as communication via a touch screen, keyboard, and the like), audio communication, textual communication and/or video communication (such as, gestures). Typically, a graphical user interface (GUI) of the present invention is a type of interface that allows users to interact with electronic elements/devices such as graphical icons and visual indicators such as secondary notation, as opposed to using only text via the command line. That said, the graphical user interfaces are typically configured for audio, visual and/or textual communication, and are configured to receive input and/or provide output using one or more user device components and/or external auxiliary/peripheral devices such as a display, a speaker, a microphone, a touch screen, a camera, a GPS device, a keypad, a mouse, and/or the like. In some embodiments, the graphical user interface may include both graphical elements and text elements. The graphical user interface is configured to be presented on one or more display devices associated with user devices, entity systems, auxiliary user devices, processing systems and the like.

An electronic activity, also referred to as a "technology activity", "technology activity event", or a "user activity", such as a "resource transfer" or "transaction", may refer to any activities or communication between a user or entity and the financial institution, between the user and the entity, activities or communication between multiple entities, communication between technology applications and the like. A resource transfer may refer to a payment, processing of funds, purchase of goods or services, a return of goods or services, a payment transaction, a credit transaction, or other interactions involving a user's resource or account. In the context of a financial institution or a resource entity such as a merchant, a resource transfer may refer to one or more of: transfer of resources/funds between financial accounts (also referred to as "resources"), deposit of resources/funds into a financial account or resource (for example, depositing a check), withdrawal of resources or finds from a financial account, a sale of goods and/or services, initiating an automated teller machine (ATM) or online banking session, an account balance inquiry, a rewards transfer, opening a bank application on a user's computer or mobile device, a user accessing their e-wallet, applying one or more coupons to purchases, or any other interaction involving the user and/or the user's device that invokes or that is detectable by or associated with the financial institution. A resource transfer may also include one or more of the following: renting, selling, and/or leasing goods and/or services (e.g., groceries, stamps, tickets, DVDs, vending machine items, and the like); making payments (e.g., paying monthly bills; and the like); loading money onto stored value cards (SVCs) and/or prepaid cards; donating to charities; and/or the like. Unless specifically limited by the context, a "resource transfer," a "transaction," a "transaction event," or a "point of transaction event," refers to any user activity (financial or non-financial activity) initiated between a user and a resource entity (such as a merchant), between the user and the financial instruction, or any combination thereof. In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a funds/resource transfer between account, funds/resource transfer as a payment for the purchase for a product, service, or the like from a merchant, and the like. Typical financial transactions or resource transfers include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures, and the like.

In accordance with embodiments of the invention, the term "user" may refer to a customer or the like, who utilizes an external apparatus such as a user device, for executing resource transfers or transactions. The external apparatus may be a user device (computing devices, mobile devices, smartphones, wearable devices, auxiliary devices, and the like), a payment instrument (credit cards, debit cards, checks, digital wallets, currency, loyalty points), and/or payment credentials (account numbers, payment instrument identifiers). In some embodiments, the user may seek to perform one or more user activities using a user application of the invention, which is stored on a user device (e.g., as a multi-channel cognitive resource user application mobile application of the user's smart phone). In some embodiments, the user may perform transactions by swiping payment instruments at a transaction terminal, for example, by swiping a magnetic strip of a credit card along a magnetic reader of a transaction terminal. In some embodiments, the transactions may be performed by wireless communication or "tapping" between the customer device and a transaction terminal. In accordance with some embodiments of the invention, the term "tap" or "tapping" may refer to bringing an external apparatus close to or within a predetermined proximity of the activity interface device or transaction terminal interface, or auxiliary user devices, so that information (such as encrypted tokens, financial resource/account identifiers, and the like) can be communicated wirelessly between the external apparatus and the devices using short range wireless transmission technology, such near-field communication (NFC) technology, radio-frequency (RF) technology, audio-frequency communication, or the like. Tapping may include physically tapping the user device against an appropriate portion of the auxiliary user device or the transaction terminal or it may include only waving or holding the user device near an appropriate portion of the auxiliary user device or the transaction terminal without making physical contact with the transaction terminal.

There has been a significant increase in the number of electronic activities, particularly online and mobile activities due to widespread use of smartphone, tablet computers, laptop computers, transaction terminals, and electronic computing devices in general. Performing electronic activities requires the devices to repeatedly fetch relevant data from backend servers, external databases/networks, and/or other backend systems/devices. However, fetching data from backend systems results in a time lag, causing delays in execution of the electronic activities. Some conventional systems employ data caching, in an attempt to reduce these delays. However, these conventional systems typically cache almost all provided data commencing since the time of the users' login, in its entirety. Conventional systems are neither able to determine the relevancy of the data for current activities, much less for future activities, nor envisage how long the data needs to be cached for, thereby resulting in large amounts of irrelevant cached data that is stored over extended time periods. However, caching such immense amounts of data causes severe burdens on data caching servers, such as heavy memory and processing loads. Moreover, the enormity of the amounts of the data being cached results in slow turnaround times for the searching and fetching relevant data, thereby impeding the very purpose of data caching. In addition, typically, the data cached by conventional systems is specific to a particular device, and conventional systems are not able to transform cached data across channels, causing further delays.

The present invention, as described in detail with respect to FIGS. 1 to 4, provides a novel dynamic management of stored cache data. Specifically, the present invention is not only structured for selective proactive data caching based on light-weight granular data caching based on construction of adapted hierarchical data objects, for reducing memory and processing burdens on data caching servers and reducing turnaround time for activity execution, it is also structured for proactive alleviation of obsolete data, dynamic pre-population and fetching of cached data based on determining actions preceding initiation of activities by caching most current data at precise time to fetch parameters and retaining the data only until precise time to live parameters and discarding the data thereafter, as well, thereby precluding perpetual caching of data over extended time periods and also precluding prematurely caching data that is not current. The improvements provided by the specific network and application structure of the present invention (involving proactive processors at edge nodes, usage monitor engine, distributed cache storage for storing and indexing hierarchical granular adapted cache data objects, and/or the like) may result in immensely faster cache data operations, such as within a few milliseconds (e.g., 0.002 seconds), which would otherwise require multiple seconds (e.g., 20 seconds) or even minutes in the absence of the present invention. For instance, the present invention may provide a thousand-fold improvement in processing time, which would not be possible without the specific network and application structure of the present invention involving proactive processors at edge nodes, usage monitor engine, distributed cache storage for storing and indexing hierarchical granular adapted cache data objects, and/or the like, across application, presentation, entity and service layers.

FIG. 1 illustrates a network environment 100 for dynamic management of stored cache data, in accordance with one embodiment of the present invention. As illustrated in FIG. 1, a caching technology system 106, is provided configured for dynamic management of stored cache data, e.g., based on analyzing prior usage information and predicting subsequent usage information. Specifically, the cross-channel data caching application 144 of the caching technology system 106 is structured for (i) light-weight granular data caching based on construction of adapted hierarchical data objects with improved indexing, and (ii) proactive alleviation of obsolete data, dynamic pre-population and fetching of cached data based on determining actions preceding initiation of activities involving caching most current data at precise time to fetch parameters and retaining the data only until precise time to live parameters and discarding the data thereafter, for preventing data redundancy based errors, and for reducing memory and processing burdens on data caching servers and reducing turnaround time for activity execution. The caching technology system 106 is operatively coupled, via a network 101 to one or more user devices 104, auxiliary user devices 170, resource processing devices 120, entity system(s) 180 (e.g., financial institution systems 180), entity databases 190, and other external systems/third-party servers not illustrated herein. In this way, the caching technology system 106 can send information to and receive information from multiple user devices 104, auxiliary user devices 170, and/or resource processing devices 120, via network 101.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101. The network 101 is configured to establish an operative connection between otherwise incompatible devices, for example establishing a communication channel, automatically and in real time, between the one or more user devices 104 and one or more of the auxiliary user devices 170 and/or resource processing devices 120, (for example, based on receiving a user input, or when the user device 104 is within a predetermined proximity or broadcast range of the auxiliary devices 170 and/or resource processing devices 120), as illustrated by communication channel 101a. Therefore, the system, via the network 101 may establish, operative connections between otherwise incompatible devices, for example by establishing a communication channel 101a between the one or more user devices 104 and the auxiliary user devices 170 and/or resource processing devices 120. In this regard, the network 101 (and particularly the communication channels 101a) may take the form of contactless interfaces, short range wireless transmission technology, such near-field communication (NFC) technology, near-field low energy communication, audio frequency (AF) waves, wireless personal area network, radio-frequency (RF) technology, and/or other suitable communication channels. Tapping may include physically tapping the external apparatus, such as the user device 104, against an appropriate portion of the auxiliary user device 170 and/or resource processing devices 120, or it may include only waving or holding the external apparatus near an appropriate portion of the auxiliary user device without making physical contact with the auxiliary user device and/or resource processing devices 120.

In some embodiments, the user 102 is an individual that wishes to conduct one or more electronic activities or technology activity events with resource entities, for example using the user device 104. As such, in some instances, the user device may have multiple user applications 122 stored/installed on the user device 104 and the memory device 116 in particular. In some embodiments, the user application 122 is used to conduct one or more electronic activities or technology activity events with resource entities. In some embodiments the user application 122 may refer to a third party application or a user application stored on a cloud used to access the caching technology system 106 and/or the auxiliary user device 170 through the network 101, communicate with or receive and interpret signals from auxiliary user devices 170, and the like. The user 102 may subsequently navigate through the interface, perform one or more searches or initiate one or more activities or resource transfers using a user interface provided by the user application 122 of the user device 104. In some embodiments, the user 102 may be routed to a particular destination using the user device 104. In some embodiments, a purchase or a transaction may be made by the user 102 using the user device 104. In some embodiments the auxiliary user device 170 requests and/or receives additional information from the caching technology system 106, entity system 180 and/or the user device 104 for authenticating the user and/or the user device, determining appropriate transaction queues, performing the transactions and other functions.

FIG. 1 also illustrates the user device 104. The user device 104, herein referring to one or more user devices, wherein each device may generally comprise a communication device 110, a display device 112, a geo-positioning device 113, a processing device 114, and a memory device 116. Typically, the user device 104 is a computing system that allows a user 102 to interact with other systems to initiate or to complete activities, resource transfers, and transactions for products, and the like. The processing device 114 is operatively coupled to the communication device 110 and the memory device 116. The processing device 114 uses the communication device 110 to communicate with the network 101 and other devices on the network 101, such as, but not limited to the entity system 180, the auxiliary user device 170, resource processing devices 120, and the caching technology system 106. As such, the communication device 110 generally comprises a modem, server, or other device for communicating with other devices on the network 101. In some embodiments the network 101 comprises a network of distributed servers. In some embodiments, the processing device 114 may be further coupled to a display device 112, a geo-positioning device 113, and/or a transmitter/receiver device, not indicated in FIG. 1. The display device 112 may comprise a screen, a speaker, a vibrating device or other devices configured to provide information to the user. In some embodiments, the display device 112 provides a presentation of the user interface of the user application 122. The geo-positioning device 113 may comprise global positioning system (GPS) devices, triangulation devices, accelerometers, and other devices configured to determine the current geographic location of the user device 104 with respect to satellites, transmitter/beacon devices, telecommunication towers and the like. In some embodiments the user device 104 may include authentication devices like fingerprint scanners, microphones (e.g., for voice recognition), visual capture devices (e.g., for facial recognition) and the like that are configured to receive one or more types of authentication credentials from the user.

The user device 104 comprises computer-readable instructions 124 stored in the memory device 116, which in one embodiment includes the computer-readable instructions 124 of the user application 122. In this way, users 102 may authenticate themselves, initiate activities, and interact with or receive and decode signals from the auxiliary user devices 170 and/or resource processing devices 120, communicate with the caching technology system 106, authorize a transaction, and/or complete a transaction using the central user interface of the user device 104. As discussed previously, the user device 104 may be, for example, a desktop personal computer, a mobile system, such as a cellular phone, smart phone, personal data assistant (PDA), laptop, wearable device, a smart TV, a smart speaker, a home automation hub, augmented/virtual reality devices, or the like. The computer readable instructions 124 such as computer readable/executable code of the user application 122, when executed by the processing device 114 are configured to cause the user device 104 and/or processing device 114 to perform one or more steps described in this disclosure, or to cause other systems/devices to perform one or more steps described herein.

The resource processing devices 120 or transaction terminals as used herein may refer to one or more electronic devices that facilitate user transactions or activities. In this regard the resource processing devices 120 can comprise Automated Teller Machines (ATMs), resource terminals or Point of sale devices (POS), vending machines, checkout registers, ticket vending machines, automated retail transaction devices, banking terminals in a financial institution and other transaction terminals that involve financial transactions in one form or another. In some embodiments the resource processing device 120 refers to devices that facilitate execution of non-financial transactions or activities, for example, check-in terminals for various industries, for example: hospitality, travel, and the like, information kiosks and other transaction terminals that do not involve a user performing a financial transaction via the transaction terminal. In some embodiments the resource processing devices 120 facilitate execution of both financial and non-financial transactions/activities. In some embodiments, resource processing devices 120 may refer to user devices that facilitate financial and/or non-financial transactions, such as laptop computers, tablet computers, smartphones, wearable devices, personal digital assistants (PDAs), and other portable or stationary computing devices. In some embodiments, the resource processing devices 120 may be owned, operated and/or otherwise associated entities and are installed at suitable locations, such that the user can travel to the location of the resource processing device to execute transactions. In some embodiments, the resource processing device 120 may be owned, operated and/or otherwise associated with an entity, such as a financial institution. In some embodiments, the resource processing devices 120 may be owned, operated and/or otherwise associated with the user. The embodiments described herein may refer to the initiation and completion of an electronic activity, a user activity or a transaction.

As illustrated by FIG. 1, the resource processing device 120 may comprise an ATM 120*a*, a resource terminal 120*b* (e.g., a point of sale terminal 120*b*), a user device 120*c* (such as one or more user device 104 and/or one or more auxiliary user devices 170), vending machines and/or other devices that are configured to facilitate the user activity. The user device 120*c* may be one of the user devices 104 and may comprise a mobile communication device, such as a cellular telecommunications device (i.e., a smart phone or mobile phone), a computing device such as a laptop computer, a personal digital assistant (PDA), a mobile Internet accessing device, or other mobile device including, but not limited to portable digital assistants (PDAs), pagers, mobile televisions, laptop computers, cameras, video recorders, audio/video player, radio, GPS devices, any combination of the aforementioned, or the like. The resource processing device 120 may include a communication device, a processing device, a user interface, an authentication device and a memory device having an authentication application/module, a resource datastore and one or more processing applications stored therein.

In some embodiments, the caching technology system 106 (also referred to as the caching technology system environment 106) comprises a plurality of networked devices, systems, applications, an electronic communication generating and cross-channel data caching application 144 (whose processing steps and the network and application architecture it constructs and/or operates on are detailed with respect to FIGS. 2B, 3A and 4) and/or servers associated with technology infrastructure of an entity, in operative communication, as illustrated in FIGS. 2A and 2B described later on. As further illustrated in FIG. 1, the caching technology system 106 generally comprises a communication device 136, at least one processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the entity systems 180, auxiliary user devices 170, resource processing devices 120, and/or the user device 104. The processing device 138 uses the communication device 136 to communicate with the network 101 and other devices of the entity's technology infrastructure, such as, but not limited to plurality of networked devices, systems, technology applications, cross-channel data caching application 144 and/or servers that may be located across various geographical locations, e.g., via an entity network (not illustrated). As such, the communication device 136 generally comprises a modem, server, wireless transmitters, or other devices for communicating with devices on the network 101. The memory device 140 typically comprises a non-transitory computer readable storage medium, comprising computer readable/executable instructions/code, such as the computer-readable instructions 142, as described below.

As further illustrated in FIG. 1, the caching technology system 106 comprises computer-readable instructions 142 or computer readable program code 142 stored in the memory device 140, which in one embodiment includes the computer-readable instructions 142 of a cross-channel data caching application 144. The computer readable instructions 142, when executed by the processing device 138 are configured to cause the system 106/processing device 138 to perform one or more steps described in this disclosure, or to cause other systems/devices (such as the user device 104, the user application 122, resource processing devices 120, entity system 180, entity database 190, and the like) to perform one or more steps described herein. In some embodiments, the memory device 140 includes a data storage for storing data related to user transactions and resource entity information, but not limited to data created and/or used by the cross-channel data caching application 144. The cross-channel data caching application 144, when operated by the processing device 138 is structured for dynamic management of stored cache data, by (i) light-weight granular data caching based on construction of adapted hierarchical data objects with improved indexing, and (ii) proactive alleviation of obsolete data, dynamic pre-population and fetching of cached data based on determining actions preceding initiation of activities involving caching most current data at precise time to fetch parameters and retaining the data only until precise time to live parameters and discarding the data thereafter, for preventing data redundancy based errors, and for reducing memory and processing burdens on data caching servers and reducing turnaround time for activity execution.

FIG. 1 further illustrates one or more auxiliary user devices 170, in communication with the network 101. The auxiliary user devices may comprise peripheral devices such as speakers, microphones, smart speakers, and the like, display devices, a desktop personal computer, a mobile system, such as a cellular phone, smart phone, personal data assistant (PDA), laptop, wearable device, a smart TV, a smart speaker, a home automation hub, augmented/virtual reality devices, or the like. In some embodiments, the structure and/or functioning of the auxiliary user devices 170 is substantially similar to that of the user device(s) 104, while in other embodiments, the auxiliary user devices 170 supplement/enhance the structure and/or functioning of the user device(s) 104. In some embodiments, the entity database 190 may comprise user data. In some embodiments, the entity database 190 may comprise the system of record (SOR) event data hub 270 described with respect to FIG. 2B later on.

FIG. 2A depicts a schematic diagram 200A of a network layer environment for dynamic management of stored cache data, in accordance with one embodiment of the present invention. FIG. 2B depicts a schematic diagram 200B of a network processing environment for dynamic management of stored cache data, in accordance with one embodiment of the present invention. The cross-channel data caching application 144 is structured for dynamic management of stored cache data. The cross-channel data caching application 144 is also structured for (i) light-weight granular data caching based on construction of adapted hierarchical data objects with improved indexing, and (ii) proactive alleviation of obsolete data, dynamic pre-population and fetching of cached data based on determining actions preceding initiation of activities, for preventing data redundancy based errors, and for reducing memory and processing burdens on data caching servers and reducing turnaround time for activity execution.

FIG. 2A depicts the communication functions framework and/or application architecture framework of the systems and devices underlying the invention network environment of FIG. 1, in accordance with one embodiment of the invention. Here, the invention may be structured into a plurality of layers. In some embodiments, each of the layers may be structured to communicate and interact with only the layers immediately above and below it, unless the layer does not have layers below or above. It is understood that the application architecture framework is non-limiting, and that the invention as illustrated in FIGS. 1, 2B, and 3A-3C and 4, may comprise any suitable application architecture framework not illustrated herein.

In the non-limiting instance of application architecture framework illustrated by FIG. 2A, the framework may comprise an application layer 201 in operative communication with user devices 104, auxiliary user devices 170 and/or resource processing devices 120. Specifically, the application layer 201, via its components: mobile application component 201a, desktop application component 201b, interactive voice response (IVR) application component 201c, and/or the like, may operatively communicate directly with respective technology or device applications of the user devices 104, auxiliary user devices 170 and/or resource processing devices 120 which implement a component of communication between the client and server. The application layer 201 may be structured for file sharing, message handling, and database access, through the protocols at the application layer, such as HTTP, FTP, SMB/CIFS, TFTP, and SMTP. In some embodiments, the framework comprises one or more application gateways 202, such as application getaway 202a, application gateway 202b, and/or the like. In some embodiments, the one or more application gateways 202 may be a load balancer structured to route traffic based on source IP address and port, to a destination IP address and port.

The presentation layer 203 is structured for data formatting and data translation into a format specified by the application layer during the encapsulation of outgoing messages while being passed down the protocol stack. The presentation layer typically comprises user interface (UI) components 203a and UI process components 203b. In some embodiments, the entity layer 204, also referred to as the business layer or domain logic layer where application logic and program code resides. The entity layer 204 is structured to accept user requests from the browser, process them, and determine the routes through which the data will be accessed. The workflows by which the data and requests travel through the back end are encoded in the entity layer. In this regard, the entity layer 204 comprises an application façade 204a.

The service layer 205 comprises components associated with various entity service data types such as entity service data type 1 205a (e.g., rewards data type), entity service data type 2 205b (e.g., user information data type), and entity service data type 3 205c (e.g., bookings data type). In some embodiments, the service layer 205 is structured for data calls and provides access to the persistent storage of an application. The data storage infrastructure includes a server and a database management system, software to communicate with the database itself, applications, and user interfaces to obtain data and parse it.

The present invention is structured to construct, and store adapted hierarchical cache data objects 340 at an underlying cache layer (e.g., associated with distributed cache database 260 of FIG. 2B), such that data is cached in elemental or smaller discrete fragments that can be controlled, and operated upon individually.

The present invention is structured to dynamically bring forth relevant constructed adapted hierarchical cache data objects 340 to front layers (e.g., to application layer 101 or presentation layer 203 or entity layer 204, from underlying storage at a cache layer (e.g., associated with distributed cache database 260 of FIG. 2B), via the service layer 205), based on determining usage patterns. In this regard, the system triggers light-weight calls to pull adapted hierarchical cache data objects 340 to application gateways layer 202 (which typically function as a first interaction point) proactively, based on determining usage patterns. Here, the system triggers, proactively, light-weight calls to pull the only the relevant or required cache data objects of the plurality of adapted hierarchical cache data objects 340 from the cache layer to entity layer 204 or application layer 201, upon merely detecting access by a user (e.g., detecting the user has opened a particular application, the user is in the process of inputting login credentials, etc.) by determining the technology activity event that the user is likely to initiate (e.g., based on determined usage patterns), before the user has even begun initiating the technology event. Also, since only the relevant or required cache data objects of the plurality of adapted hierarchical cache data objects 340 are fetched, the network bandwidth usage is minimal and not cluttered, and the activity processing time is reduced because the required cached data is already fetched and available before the processing of the activity has even begun. On the contrary, in conventional systems, the process of fetching the cached data can only be even initiated, after activity has been initiated and the processing thereof is well underway, because conventional systems can typically determine that cached data is needed only after the processing of the activity is initiated. Moreover, because conventional systems store cached data in immense files, the already delayed processing of the activity due to delays in beginning the process of fetching data is further exacerbated by delayed and slow fetching and transmission of the cached data because the entire cached data would need to be fetched in its immense size.

Moreover, the system transmits control signals to the application layer 201 to cause the application layer 201 and/or its relevant components (e.g., via relevant proactive processors 214a-214c) to perform periodic scans of storage locations or systems where user data or activity data is stored, such as the entity database 190, record (SOR) event data hub 270, the service layer 205, etc., to check for recent updates to the data and to determine data that is rendered incompatible and/or redundant in light of the recent updates, to determine obsolete cached data, and/or the like. Consequently, the system transmits control signals to the cache layer (e.g., associated with distributed cache database 260 of FIG. 2B), to cause it to (i) flush incompatible, redundant and obsolete data, and (ii) update relevant cache data objects accordingly (e.g., by only constructing new cache data objects for the specific fragments of updated data). In this regard, specifically, the system is structured to map adapted hierarchical cache data objects 340 to database storage columns (e.g., that of the entity database 190, record (SOR) event data hub 270, the service layer 205, etc.). Here, the cache layer flushes the incompatible, redundant and obsolete stored thereon by integrating the determined recent updates (and the determined incompatible, redundant and obsolete data) with the mapping of the adapted hierarchical cache data objects 340 to database storage columns. As an improvement provided by the present invention, the cache layer may selectively flush only relevant fragments of cached data, i.e., only relevant (to the determined updates) adapted hierarchical cache data objects of the plurality of the adapted hierarchical cache data objects 340, instead of undesirably flushing all of the cached data, or none of the cached data. Conventional systems store cached data in immense files, and are not capable of selectively flushing or updating specific fragments of data within the immense stored data. In this manner, the present invention keeps the cache layer lighter by removing incompatible, redundant and obsolete data objects and improves indexing on the cache layer.

In this manner, relevant and required cache data can be fetched faster to the application layer 201 and/or the associated devices (104, 170, 120, and/or the like) and time lag for processing activities using the fetched cache data can be eliminated or significantly reduced because (i) the relevant and required cache data objects (of the plurality of the adapted hierarchical cache data objects 340) are fetched before technology activity event is even initiated by a user at a device (e.g., devices 104, 170, 120, and/or the like), and (ii) only light-weight, i.e., minimal data size cache data objects travel through the network, keeping the network response and communication/transmission response quicker and lighter.

As illustrated in FIG. 2B, the novel network environment comprises a plurality of communication channels represented by mobile application 201a (e.g., associated with a communication channel type A), desktop application 201b (e.g., associated with a communication channel type B), interactive voice response (IVR) application 201c (e.g., associated with a communication channel type C), and/or the like, e.g., at the application layer 201 (as illustrated in FIG. 2A). Here, channel-specific localized cache data stores (212a, 212b, 212c) are provided at each communication channel as illustrated. Typically, the cache data stores 212a-212c are structured for temporarily storing fetched cache data in the format compatible with the respective communication channel, e.g., proactively fetched relevant cache data objects, where each individual cache data object is temporarily stored until its specific individual time to live parameter.

A plurality of proactive processors (214a, 214b, 214c) are provided for each respective communication channel as illustrated, and are operatively coupled to the respective channel-specific localized cache data stores (212a, 212b, 212c). The proactive processors 214a-214c are structured for collecting metadata associated with access events (e.g., the user opening a particular application, the user inputting login credentials, etc.) associated with the respective coupled channel (e.g., via communication channels 216a, 216b, 216c), transmit the extracted metadata to a usage monitor engine 220 for analyzing the metadata of the access event to determine a likely technology activity event to be initiated by the user at the respective channel, and consequently initiate proactive events to populate relevant and required (for the determined likely activity to be initiated by the user) adapted hierarchical cache data objects of the plurality of the adapted hierarchical cache data objects 340 at the respective cache data stores (212a, 212b, 212c).

Here, the plurality of proactive processors (214a, 214b, 214c) are operatively coupled to the usage monitor engine 220 (also referred to as a usage monitor engine application 220). The usage monitor engine 220 is structured to analyze event metadata retrieved from the entity layer 204 and/or the proactive processors 214a-214c, over time to determine/construct usage patterns for each user, and for each specific channel that the user utilizes for conducting network activity events. In this regard, the usage monitor engine 220 may receive an event feed tagged against a user specific access from the entity layer 214, as indicated by channel 224. In some embodiments, the usage monitor engine 220 is structured to dynamically and consistently modify and update the usage patterns as additional activities are analyzed thereby, and transmit current usage updates to the entity layer 214 as indicated by channel 222. The usage monitor engine 220 is further structured to analyze extracted metadata associated with access events (received from a respective proactive processor (214a-214c)), and determine matches with the constructed usage patterns of the particular user at the specific channel, in order to determine a likely technology activity event to be initiated (e.g., imminently) by the user at the respective channel, and transmit the same to the respective proactive processor (214a-214c).

As discussed, the usage monitor engine 220 is operatively coupled to the entity layer 204. The usage monitor engine 220 is structured to dynamically and consistently modify and update the usage patterns as additional activities are analyzed thereby, and transmit current usage updates to the entity layer 214 as indicated by channel 222. In response, the entity layer 204 is structured to determine the personalized and adapted relevant data, specific to the particular user and their usage patterns, to be cached for subsequent activities in accordance with the usage patterns and extract the relevant data to be cached. Here, the entity layer 204 may in turn communicate with applicable the service layer components such as entity service data type 1 205a (e.g., rewards data type), entity service data type 2 205b (e.g., user information data type), and entity service data type 3 205c (e.g., bookings data type) to retrieve the relevant data from the system of record (SOR) event datahub 270. Once the relevant data to be cached is retrieved, adapted hierarchical cache data objects 340 are constructed and stored at the distributed cache 260 (as indicated by communication channel 272). In other words, the entity layer 204 is structured to push personalized adapted hierarchical cache data objects 340 to the distributed cache storage 260. Here, the adapted hierarchical cache data objects 340 (340a, 340b, 340c, . . . , 340n) constructed by the invention are stored at the distributed cache storage 260.

Moreover, the entity layer 204 (automatically or based on receiving instructions or triggers) may perform periodic scans of storage locations or systems where user data or activity data is stored, such as the entity database 190, record (SOR) event data hub 270 (which may be a backend system) for recent updates to the data and to determine data that is rendered incompatible and/or redundant in light of the recent updates, to determine obsolete cached data, and/or the like. Consequently, the entity layer 204 (automatically or based on receiving instructions or triggers) transmits control signals to the cache layer (e.g., associated with distributed cache database 260 of FIG. 2B), to cause it to (i) delete/flush incompatible, redundant and obsolete data, and (ii) update relevant cache data objects accordingly (e.g., by only constructing new cache data objects for the specific fragments of updated data).

The entity layer 204 is further operatively coupled to the plurality of proactive processors (214a, 214b, 214c). After a proactive processor (214a, 214b, 214c) (e.g., via the usage monitor engine 220) determines a technology activity event to be initiated by the user, the proactive processor (214a, 214b, 214c) may trigger the entity layer 204 (e.g., via respective communication channels 218a, 218b, 218c) to check if the relevant and required (for the determined likely activity to be initiated by the user) adapted hierarchical cache data objects are present at the entity layer 204, and in not, fetch the same from the distributed cache 260 at the cache layer to the entity layer 204 (via communication channel 262). The extracted relevant and required (for the determined likely activity to be initiated by the user) adapted hierarchical cache data objects of the plurality of the adapted hierarchical cache data objects 340 may then be populated at the respective cache data stores (212a, 212b, 212c) via the proactive processors (214a, 214b, 214c).

In some embodiments, as a non-limiting example, during a regular learning operation mode or an initial set-up mode, once an activity is initiated by a user at any of the plurality of communication channels, mobile application 201a, desktop application 201b, interactive voice response (IVR) application 201c, and/or the like, the application communicates with the entity layer 204 to retrieve the data required for the activity, as indicated by communication channels 215a, 215b, and 215c. The entity layer 204 may in turn communicate with applicable the service layer components such as entity service data type 1 205a (e.g., rewards data type), entity service data type 2 205b (e.g., user information data type), and entity service data type 3 205c (e.g., bookings data type) to retrieve the relevant data from the system of record (SOR) event datahub 270. As a part of a technology usage analysis mechanism, the entity layer 204 may transmit an event feed comprising technology usage data (e.g., metadata associated with the initiated activities, activities being processed, completed activities, and/or the like) tagged against a user specific access to the usage monitor engine 220. In some embodiments, the entity layer 204 may cross-tag the metadata with respective activity attributes such as (i) activity channel attributes (e.g., type of communication channel, associated technology application, etc.), (ii) activity parameters (e.g., activity type, authentication requirements, activity time interval, activity duration, etc.), (iii) data required for processing of the activity (e.g., cached data fetched, data transmitted, etc.), and/or the like, for each individual user. The usage monitor engine 220 is structured to analyze event metadata retrieved from the entity layer 204 (and/or the proactive processors 214a-214c) over time to determine/construct usage patterns for each user, and for each specific channel that the user utilizes for conducting network activity events. The usage monitor engine 220 is structured to analyze event metadata retrieved from the entity layer 204 and/or the proactive processors 214a-214c, over time to determine/construct usage patterns for each user, and for each specific channel that the user utilizes for conducting network activity events.

The system (e.g., at the proactive processors 214a-214c) may analyze the determined usage patterns, and determines the specific technology data to be cached for likely recurring events and the compatible format and data transformation required for the respective channel of the predicted event. The system (e.g., at the proactive processors 214a-214c) may trigger retrieval of truncated technology data (i.e., only the specific data portions that are required to be cached) for caching from a usage database (SOR event datahub 270), e.g., via entity layer 204 in communication with applicable the service layer components such as entity service data type 1 205a (e.g., rewards data type), entity service data type 2 205b (e.g., user information data type), and entity service data type 3 205c (e.g., bookings data type). The system may then construct a plurality of adapted hierarchical cache data objects 240 in a distributed cache layer (distributed cache 260 at the cache layer). Here, as described later on with respect to FIG. 300C, the system may identify a plurality of data element types 344, split the retrieved truncated technology data into a plurality of cache data objects 340, determine a hierarchy of each of the plurality of cache data objects 340, map the cache data object 340 to an associated cache data object identifier 342, and link (DS1, DS2, ..., DSN) the cache data object 340 to a parent user identifier data element. The system may then cache the constructed plurality of adapted hierarchical cache data objects 340 at the distributed cache 260 at the cache layer, for subsequent use during a proactive operation mode.

In some embodiments, during a proactive operation mode, the usage monitor engine 220 is structured to analyze event metadata retrieved from the entity layer 204 and/or the proactive processors 214a-214c, over time to determine/ construct usage patterns for each user, and for each specific channel that the user utilizes for conducting network activity events, as described previously. The proactive processors 214a-214c may then detect an access event (e.g., the user opening a particular application, the user inputting login credentials, etc.) associated with the respective coupled channel. Here, the proactive processors 214a-214c may extract metadata associated with access events associated with the respective coupled channel (e.g., via communication channels 216a, 216b, 216c), transmit the extracted metadata to a usage monitor engine 220 for analyzing the metadata of the access event to determine a likely technology activity event to be initiated by the user at the respective channel. The proactive processor (214a-214c) may then analyze the predicted likely technology activity event to be initiated by the user at the respective channel, and further determine the data required and relevant for its processing. The proactive processor (214a-214c) may further determine that specific cache data objects associated with the required data. Here, the proactive processor (214a-214c) triggers, proactively, light-weight calls to pull the only the relevant or required cache data objects of the plurality of adapted hierarchical cache data objects 340 from the cache layer to entity layer 204 or application layer 201, upon merely detecting access by a user (e.g., detecting the user has opened a particular application, the user is in the process of inputting login credentials, etc.) by determining the technology activity event that the user is likely to initiate (e.g., based on determined usage patterns), before the user has even begun initiating the technology event. Here, the proactive processor (214a-214c) may trigger the entity layer 204 (e.g., via respective communication channels 218a, 218b, 218c) to check if the relevant and required (for the determined likely activity to be initiated by the user) adapted hierarchical cache data objects are present at the entity layer 204, and in not, fetch the same from the distributed cache 260 at the cache layer to the entity layer 204 (via communication channel 262). The extracted relevant and required (for the determined likely activity to be initiated by the user) adapted hierarchical cache data objects of the plurality of the adapted hierarchical cache data objects 340 may then be populated at the respective cache data stores (212a, 212b, 212c) via the proactive processor (214a-214c). Subsequently, the proactive processor (214a-214c) may detect initiation of the first technology activity event by a user at the respective application (201a, 201b, 201c). In response to determining that the first technology activity event matches the proactively predicted technology activity event, the proactive processor (214a-214c) may then initiate the first technology activity event using the first adapted hierarchical cache data object. Because only the relevant or required cache data objects of the plurality of adapted hierarchical cache data objects 340 are fetched, the network bandwidth usage is minimal and not cluttered, and the activity processing time is reduced because the required cached data is already fetched and available before the processing of the activity has even begun.

FIG. 3A depicts a high level process flow 300A for dynamic management of stored cache data by construction of adapted hierarchical cache data objects, in accordance with one embodiment of the present invention. FIG. 3B depicts a schematic representation 300B of cached data in accordance with conventional system. FIG. 3C depicts a schematic representation 300C of adapted hierarchical cache data objects, in accordance with one embodiment of the present invention. In some embodiments, the processing device 138 of the caching technology system 106 may execute the computer-readable program code/instructions 142 to perform one or more steps of the process flow 300A. The caching technology system 106 may perform some or all of the steps of the process flow 300A, or cause other devices (entity system 180, entity database 190, and/or other devices communicating via network 101) to perform some or all of the steps of the process flow 300A. The process flow 300A is structured for dynamic management of stored cache data. Here, the process flow 300A is directed to light-weight granular data caching based on construction of adapted hierarchical data objects with improved indexing, for reducing memory and processing burdens on data caching servers and reducing turnaround time for activity execution.

As discussed previously, conventional systems store cached data in immense files. As a non-limiting schematic depiction of conventional cached data 312, FIG. 3B illustrates the cached data 314a associated with user 1 and cached data 418a associated with user N, where the cached data contents 316a-316n and 320a-320n, respectively, are structured on an immense amalgamated indivisible manner, with a very large file size. Moreover, the expiration time (314*b*, 318*b*), if any at all, is assigned for the entirety of the cached data 314*a* associated with user 1 and cached data 418*a* associated with user N, and is typically a constant duration.

Now referring to FIGS. 3A and 3C, initially, at block 302, the system may initiate, via a proactive processor application (214*a*-214*c*), a technology usage analysis mechanism comprising technology usage data associated with a plurality of users. In some embodiments, initiating the technology usage analysis mechanism further comprises retrieving, via a usage monitor engine application, metadata associated with prior technology usage events associated with the plurality of users, wherein the prior technology usage events comprise a user activity log associated with activities initiated by the plurality of users using one or more network devices associated with one or more communication channels. As a part of the technology usage analysis mechanism, the entity layer 204 may transmit an event feed comprising technology usage data (e.g., metadata associated with the initiated activities, activities being processed, completed activities, and/or the like) tagged against a user specific access to the usage monitor engine 220. In some embodiments, the entity layer 204 may cross-tag the metadata with respective activity attributes such as (i) activity channel attributes (e.g., type of communication channel, associated technology application, etc.), (ii) activity parameters (e.g., activity type, authentication requirements, activity time interval, activity duration, etc.), (iii) data required for processing of the activity (e.g., cached data fetched, data transmitted, etc.), and/or the like, for each individual user. The usage monitor engine 220 is structured to analyze event metadata retrieved from the entity layer 204 (and/or the proactive processors 214*a*-214*c*) over time to determine/construct usage patterns for each user, and for each specific channel that the user utilizes for conducting network activity events. The usage monitor engine 220 is structured to analyze event metadata retrieved from the entity layer 204 and/or the proactive processors 214*a*-214*c*, over time to determine/construct usage patterns for each user, and for each specific channel that the user utilizes for conducting network activity events. As a non-limiting example, the system (e.g., via the usage monitor engine 220) may determine that a first user typically performs task type A (e.g., viewing a particular user information interface of a technology application) using a communications channel and associated technology application type B about every month, while another second user typically performs the same task type A (e.g., viewing a particular user information interface of a technology application) using a communications channel and associated technology application type C daily, and hence the required data needs to be cached with different time to live parameters and in different compatible formats (e.g., objects may be fetched proactively based on prior frequency of use).

The system may then construct, via the proactive processor application (214*a*-214*c*), an adapted truncated cache data retrieval command such that the truncated cache data retrieval command is structured to selectively retrieve data that matches the technology usage data, and not retrieve data that is not pertinent to the technology usage data. In some embodiments, constructing the adapted truncated cache data retrieval command further comprises analyzing the metadata associated with the prior technology usage events associated with the plurality of users; constructing, for each of the plurality of users, at least one user access routine based on determining one or more usage patterns in the metadata associated with the prior technology usage events, wherein determining one or more usage patterns further comprises determining a match between metadata associated with a first prior technology usage event at a first time interval, and metadata associated with a prior second technology usage event at a second time interval succeeding the first time interval, wherein the at least one user access routine comprises one or more user activity events based on the one user access routine; determining, for each of the plurality of users, (i) one or more event attributes associated with each of the one or more user activity events in the associated at least one user access routine, and (ii) compatible cache data objects associated with the one or more event attributes; and constructing, for each of the plurality of users, the adapted truncated cache data retrieval command to retrieve the compatible cache data objects associated with the one or more event attributes associated with the at least one user access routine. Here, determining one or more usage patterns may further comprise determining a match between metadata associated with a first sequence of prior technology usage events at a third time interval, and metadata associated with a second sequence of prior technology usages event at a fourth time interval succeeding the third time interval.

At block 304, the system may trigger, via the proactive processor (214*a*-214*c*), retrieval of truncated technology data for caching from a usage database 270 based on the adapted truncated cache data retrieval command. The system (e.g., at the proactive processors 214*a*-214*c*) may analyze the determined usage patterns, and determines the specific technology data to be cached for likely recurring events and the compatible format and data transformation required for the respective channel of the predicted event. The system (e.g., at the proactive processors 214*a*-214*c*) may trigger retrieval of truncated technology data (i.e., only the specific data portions that are required to be cached) for caching from a usage database (SOR event datahub 270), e.g., via entity layer 204 in communication with applicable the service layer components such as entity service data type 1 205*a* (e.g., rewards data type), entity service data type 2 205*b* (e.g., user information data type), and entity service data type 3 205*c* (e.g., bookings data type).

Next, at block 306, the system may construct a plurality of adapted hierarchical cache data objects 340, for each of the plurality of users, in a distributed cache layer. Here, as illustrated by FIG. 3C, the system may identify a plurality of data element types 344 in the retrieved truncated technology data based on parsing the retrieved truncated technology data. Then, for each of the plurality of data element types 344, the system may split the retrieved truncated technology data into a plurality of cache data objects 346 such that each of the plurality of cache data objects 340 comprises an associated data element type 344. The system may further determine a hierarchy of each of the plurality of cache data objects, such as whether the cache data object 346 is a standalone data type for use in a particular activity, whether the cache data object 346 is to be accompanied by a parent data object or another object pair, that would need to be used together in the particular activity, and/or the like. The system may then transform the plurality of cache data objects into the plurality of adapted hierarchical cache data objects 340 based on the determined hierarchy, wherein each of the adapted hierarchical cache data objects are (i) mapped to an associated cache data object identifier (DS1, DS2, . . . , DSN etc.), and (ii) linked to a parent user identifier data element 342. The parent user identifier data element 342 may be associated with a unique identifier for each of the adapted hierarchical cache data objects, which may also be structured to indicate the associated user, any linked objects, hierarchy and/or the like.

As non-limiting examples, as illustrated by FIG. 3C, the system may construct a first cache data object 340*a* for a first user, associated with a user identifier data element 1 342*a* having content cache data object 1 346*a* of a data element type 1 344*a* (e.g., user information). The system may construct a second cache data object 340*b* for the first user, associated with the user identifier data element 1 342*a* having content cache data object 1 346*b* of a data element type 2 344*b* (e.g., booking details). The first cache data object 340*a* and the second cache data object 340*b* may be mapped together by link DS1. The system may construct a third cache data object 340*c* for the first user, associated with the user identifier data element 1 342*a* having content cache data object 1 346*c* of a data element type 3 344*c*. The first cache data object 340*a* and the third cache data object 340*c* may be mapped together by link DS2. The system may construct a standalone first cache data object 340*d* for a second user, associated with a user identifier data element 2 342*b* having content cache data object 1 346*d* of a data element type 1 344*d*. The system may construct a second cache data object 340*e* for the second user, associated with the user identifier data element 2 342*b* having content cache data object 1 346*e* of a data element type 1 344*e*. The second cache data object 340*e* for the second user and another associated third cache data object 340*f* for the second user may be mapped together by link DSN. The system may construct a Nth cache data object 340*n* for an Nth user, associated with the user identifier data element N 342*n* having cache data content of cache data object 1 346*f* of a data element type 1 344*f*. In this manner, as indicated by block 308, the system may cache the constructed plurality of adapted hierarchical cache data objects 340, for each of the plurality of users, in the distributed cache layer 260.

Next, at block 310, the system may, for each of the plurality of adapted hierarchical cache data objects of each of the plurality of users, determine an associated determine a time to live parameter 352. Here, the system may link the determined time to live parameter 352 to the associated adapted hierarchical cache data object such that the adapted hierarchical cache data object is (i) stored only for a first time interval associated with the duration of the time to live parameter 352, and (ii) dynamically expunged upon elapse of the first time interval associated with the time to live parameter 352. The system determines individual specific time to live parameters for each of the objects 340 that is particular to the data element type, the frequency of use, type of communication channel, usage patterns of the user, and/or the like, that pertain to the specific object 340. Continuing with the non-limiting examples of FIG. 3C, the system may determine a time to live parameter 1 352*a* of duration 1 (e.g., 1 hour) for the first cache data object 340*a* for the first user, a time to live parameter 1 352*b* of another duration 2 (different from duration 1) for the second cache data object 340*a* for the first user, a time to live parameter 1 352*c* of another duration 3 (e.g., 6 hours) for the third cache data object 340*c* for the first user, a time to live parameter 1 352*d* of another duration 4 (e.g., 12 hours) for the first cache data object 340*d* for the second user, a time to live parameter 1 352*e* of duration 1 (e.g., 1 hour) for the second cache data object 340*e* for the second user, and a time to live parameter 1 352*f* of another duration 5 for the Nth cache data object 340*n* for the Nth user.

The determined time to live parameter 352 relates to how long the cached data is stored before it is discarded. Moreover, the time to live parameter 352 is customized and tailored to the specific user and the specific activity. For example, the time to live parameter may be determined to be 3 hours for a second technology activity event, and 40 minutes for a third technology activity event, based on analyzing the prior activity event data and data associated with the particular interdependent technology activity event (e.g., time duration for processing the activity event). The cached data may be erased from the cached data storage (e.g., 212*a*, 212*b*, 212*c*) upon elapse of the time to live parameters, e.g., irrespective of whether the data has been utilized for performing the interdependent technology activity events, thereby preventing undesirable burdens on cache memory devices due to perpetual or long-term storage of likely unnecessary cached data. The time to live parameter may be determined using a function that processes variables such as a context severity (e.g., intent severity), user activity information/data, and/or the like. In some embodiments, the context severity may refer to a probability score of the interdependent technology activity event occurring, prior repetitions/reoccurrences of user activities, and/or the like.

As discussed above, different hierarchical cache data objects 340 of the same user may comprise differing time to live parameters. In some embodiments, the plurality of adapted hierarchical cache data objects 340 associated with a first user comprise a first adapted hierarchical cache data object (e.g., object 340*a*) and a second adapted hierarchical cache data object of the plurality of adapted hierarchical cache data objects 340 (e.g., object 340*b*). Here, determining the associated time to live parameter 352 further comprises determining a first time to live parameter 352 (e.g., 1 hour) associated with the first adapted hierarchical cache data object of the first user, and determining a second time to live parameter 352 (e.g., 35 minutes) associated with the second adapted hierarchical cache data object of the first user. Here, the first time to live parameter 352 exceeds the second time to live parameter 352 such that the second adapted hierarchical cache data object is dynamically expunged prior to the dynamic expunging of the first adapted hierarchical cache data object.

As discussed above, hierarchical cache data objects 340 of different users, eve of the same type or being substantially similar, user may comprise differing time to live parameters based on the usage patterns of each particular user. In some embodiments, the plurality of adapted hierarchical cache data objects 340 comprise a first adapted hierarchical cache data object associated with a first user, and a second adapted hierarchical cache data object associated with a second user, wherein the first adapted hierarchical cache data object matches the second adapted hierarchical cache data object. Here, determining the associated time to live parameter 352 further comprises: determining a first time to live parameter 352 associated with the first adapted hierarchical cache data object of the first user; and determining a second time to live parameter 352 associated with the second adapted hierarchical cache data object of the second user; and wherein the first time to live parameter 352 exceeds the second time to live parameter 352 such that the second adapted hierarchical cache data object is dynamically expunged prior to the dynamic expunging of the first adapted hierarchical cache data object.

Moreover, the time to live parameters may be determined for each of the storage locations of the particular adapted hierarchical cache data object. For instance, the same object may be stored at a shorter time when stored at cache locations 212*a*-212*c*, than when stored at other cache locations such as the entity layer 204, or at the distributed cache

240. In some embodiments, determining the associated time to live parameter 352 further comprises, for a first adapted hierarchical cache data object of the plurality of adapted hierarchical cache data objects 340 of a first user of the plurality of users, determining an associated first storage level location and a second storage level location. Moreover, the system may determine a first time to live parameter 352 associated with the first storage level location, and determining a second time to live parameter 352 associated with the second storage level location, wherein the first time to live parameter 352 exceeds the second time to live parameter 352 such that the first adapted hierarchical cache data object at the second storage level location is dynamically expunged prior to the dynamic expunging of the first adapted hierarchical cache data object at the first storage level location.

In some embodiments, the system may detect, via a proactive processor application (214a-214c), a first access event via a first network device associated with a first communication channel at a first time interval, such that the first access event is detected prior to initiation of a first technology activity event by the user. The system may then populate a first adapted hierarchical cache data object of the constructed plurality of adapted hierarchical cache data objects 340 for use at a technology application associated with the first network device prior to the initiation of the first technology activity event by the user, as will be described in detail with respect to FIG. 4 later on.

In some embodiments, the system may construct one or more additional child cache data objects, and append the plurality of adapted hierarchical cache data objects 340 with the one or more additional child cache data objects.

In some embodiments, the system may determine an update to a system of records database system, and expunge the plurality of adapted hierarchical cache data objects 340 in real-time, in response to determining the update to a system of records database system. Moreover, the system transmits control signals to the application layer 201 to cause the application layer 201 and/or its relevant components (e.g., via relevant proactive processors 214a-214c) to perform periodic scans of storage locations or systems where user data or activity data is stored, such as the entity database 190, record (SOR) event data hub 270, the service layer 205, etc., to check for recent updates to the data and to determine data that is rendered incompatible and/or redundant in light of the recent updates, to determine obsolete cached data, and/or the like. Consequently, the system transmits control signals to the cache layer (e.g., associated with distributed cache database 260 of FIG. 2B), to cause it to (i) flush incompatible, redundant and obsolete data, and (ii) update relevant cache data objects accordingly (e.g., by only constructing new cache data objects for the specific fragments of updated data). In this regard, specifically, the system is structured to map adapted hierarchical cache data objects 340 to database storage columns (e.g., that of the entity database 190, record (SOR) event data hub 270, the service layer 205, etc.). Here, the cache layer flushes the incompatible, redundant and obsolete stored thereon by integrating the determined recent updates (and the determined incompatible, redundant and obsolete data) with the mapping of the adapted hierarchical cache data objects 340 to database storage columns. As an improvement provided by the present invention, the cache layer may selectively flush only relevant fragments of cached data, i.e., only relevant (to the determined updates) adapted hierarchical cache data objects of the plurality of the adapted hierarchical cache data objects 340, instead of undesirably flushing all of the cached data, or none of the cached data. Conventional systems store cached data in immense files, and are not capable of selectively flushing or updating specific fragments of data within the immense stored data. In this manner, the present invention keeps the cache layer lighter by removing incompatible, redundant and obsolete data objects and improves indexing on the cache layer.

In some embodiments, the system may, for each of the plurality of adapted hierarchical cache data objects 340 of each of the plurality of users, determine an associated determine a time to fetch parameter; and link the determined time to fetch parameter to the associated adapted hierarchical cache data object. In some embodiments, the system may, for each of the plurality of adapted hierarchical cache data objects 340 of each of the plurality of users, dynamically update the adapted hierarchical cache data object at a time interval preceding the associated determined time to fetch parameter. The time to fetch parameter may refer to the optimal time for fetching the required adapted hierarchical cache data objects for a likely technology activity event to be initiated by the user, without the data becoming obsolete by the time the technology activity event is performed. In other words, the time to fetch parameter indicates how long before the technology activity event does the required adapted hierarchical cache data objects need to be fetched, such that the most current data is available at the time of performing the technology activity event, without the data becoming obsolete by the time the technology activity event is performed. The time to fetch parameters are structured to preclude required adapted hierarchical cache data objects from being fetched at stored at the cache storage locations 212a-212c too far in advance of the technology activity event, thereby ensuring that cache storage locations 212a-212c are not overloaded with large amounts of data for prolonged time periods, and ensuring that the most current data is available at the time of performing the technology activity event. The required adapted hierarchical cache data objects that are fetched too far in advance of the technology activity event may undesirably become obsolete or irrelevant and thereby be unusable or cause errors in performing the subsequent technology activity event.

FIG. 4 depicts a high level process flow 400 for dynamic management of stored cache data, in accordance with one embodiments of the present invention. In some embodiments, the processing device 138 of the caching technology system 106 may execute the computer-readable program code/instructions 142 to perform one or more steps of the process flow 400. The caching technology system 106 may perform some or all of the steps of the process flow 400, or cause other devices (entity system 180, entity database 190, and/or other devices communicating via network 101) to perform some or all of the steps of the process flow 400. The process flow 400 is structured for dynamic management of stored cache data. Here, the process flow 400 is structured for proactive alleviation of obsolete data, dynamic pre-population and fetching of cached data based on determining actions preceding initiation of activities, for preventing data redundancy based errors, and for reducing memory and processing burdens on data caching servers and reducing turnaround time for activity execution.

Initially, at block 402, the system may detect, via a proactive processor application (214a-214c), a first access event via a first network device associated with a first communication channel at a first time interval. Here, the first access event (e.g., detecting the user has opened a particular application, the user is in the process of inputting login credentials, etc.) is detected prior to initiation of a first technology activity event by the user. The first networked device may be a user device 104, a user auxiliary device 170, a resource processing device 120, and/or the like.

Next, the system may, determine a proactive technology activity event associated with the user that is (i) compatible with the first network device associated with a first communication channel and (ii) matches the first access event. Here, the system may determine access attributes and metadata associated with the first access event. The system may then retrieve, via the usage monitor engine application 220, metadata associated with prior technology usage events associated with the users. The system may then determine a first user access routine based on determining one or more usage patterns in the metadata associated with the prior technology usage events that match the access attributes associated with the first access event. The system may then determine a proactive technology activity event associated with the user that is (i) compatible with the first network device associated with a first communication channel and (ii) matches the first user access routine. Here, the proactive processors 214a-214c may extract metadata associated with access events associated with the respective coupled channel (e.g., via communication channels 216a, 216b, 216c), transmit the extracted metadata to a usage monitor engine 220 for analyzing the metadata of the access event to determine a likely technology activity event to be initiated by the user at the respective channel. The proactive processor (214a-214c) may then analyze the predicted likely technology activity event to be initiated by the user at the respective channel, and further determine the data required and relevant for its processing.

Next, the system may, determine a first adapted hierarchical cache data object 340a of the plurality of adapted hierarchical cache data objects 340 associated with the first user that is compatible with the proactive technology activity event. Here, the system may determine one or more event attributes associated with the proactive technology activity event; and determine the first adapted hierarchical cache data object 340a of the plurality of adapted hierarchical cache data objects 340 associated with the first user that is compatible with the one or more event attributes of the proactive technology activity event. The proactive processor (214a-214c) may further determine that specific cache data objects associated with the required data.

Next, the system may, trigger one or more data presence checks associated with the first adapted hierarchical cache data object 340a at one or more technology network layers. In response to a successful data presence check, the system may selectively retrieve truncated cache data that matches the proactive technology activity event. In some embodiments, selectively retrieving truncated cache data comprises retrieving truncated cache data that matches one or more event attributes of the proactive technology activity event, further comprises retrieving the first adapted hierarchical cache data object 340a of the plurality of adapted hierarchical cache data objects 340 associated with the first user that is compatible with the one or more event attributes of the proactive technology activity event. Here, the proactive processor (214a-214c) may trigger the entity layer 204 (e.g., via respective communication channels 218a, 218b, 218c) to check if the relevant and required (for the determined likely activity to be initiated by the user) adapted hierarchical cache data objects are present at the entity layer 204, and in not, fetch the same from the distributed cache 260 at the cache layer to the entity layer 204 (via communication channel 262). The extracted relevant and required (for the determined likely activity to be initiated by the user) adapted hierarchical cache data objects of the plurality of the adapted hierarchical cache data objects 340 may then be populated at the respective cache data stores (212a, 212b, 212c) via the proactive processor (214a-214c).

In some embodiments, the system may trigger a first data presence check associated with the first adapted hierarchical cache data object 340a at an application layer associated with the first communication channel (e.g., at cache stores 212a-212c). In response to a successful first data presence check, the system may selectively retrieve truncated cache data that matches the one or more event attributes of the proactive technology activity event, comprising selectively retrieving the first adapted hierarchical cache data object 340a of the plurality of adapted hierarchical cache data objects 340 associated with the first user that is compatible with the one or more event attributes of the proactive technology activity event at a second time interval prior to initiation of the first technology activity event by the user.

In response to an unsuccessful first data presence check, the system may trigger a second data presence check associated with the first adapted hierarchical cache data object 340a at an entity layer associated with the first communication channel. In response to a successful second data presence check, the system may selectively retrieve truncated cache data that matches the one or more event attributes of the proactive technology activity event, comprising: retrieving the first adapted hierarchical cache data object 340a of the plurality of adapted hierarchical cache data objects 340 associated with the first user that is compatible with the one or more event attributes of the proactive technology activity event prior to initiation of the first technology activity event by the user; and transmitting retrieved the first adapted hierarchical cache data object 340a from the entity layer to the application layer prior to initiation of the first technology activity event by the user.

In some embodiments, selectively retrieving truncated cache data, further comprises accessing the plurality of adapted hierarchical cache data objects 340 associated with a plurality of users, and indexing the plurality of adapted hierarchical cache data objects 340 associated with a plurality of users based on a parent user identifier data element associated with the first user. The adapted hierarchical cache data objects 340 may be indexed based on the user identifier data elements 342.

Next, at block 404, the system may populate the first adapted hierarchical cache data object 340a for use at a technology application associated with the first network device prior to the initiation of the first technology activity event by the user. Here, the system may determine a time latency associated with the proactive technology activity event, wherein determining the time latency comprises determining a time to fetch parameter associated with the first adapted hierarchical cache data object; proactively extract, via a data caching application, the first adapted hierarchical cache data object 340a at a predetermined first time interval preceding a second time associated with initiation of the second technology activity event, wherein the predetermined first time interval is associated with the determined time to fetch parameter associated with the time latency of the first technology activity event.

The system may detect initiation of the first technology activity event by a user at a second time interval via the first network device associated with the first communication channel, as indicated by block 406. Subsequently, the proactive processor (214a-214c) may detect initiation of the first technology activity event by a user at the respective application (201a, 201b, 201c). In response to determining that the first technology activity event matches the proactively predicted technology activity event, the proactive processor (214*a*-214*c*) may then initiate the first technology activity event using the first adapted hierarchical cache data object. Because only the relevant or required cache data objects of the plurality of adapted hierarchical cache data objects 340 are fetched, the network bandwidth usage is minimal and not cluttered, and the activity processing time is reduced because the required cached data is already fetched and available before the processing of the activity has even begun.

Next at block 408, the system may, in response to determining that the first technology activity event matches the proactive technology activity event, initiate the first technology activity event using the first adapted hierarchical cache data object. Here, the system may process the first technology activity event, and upon completion present a user interface indicating completion or status of the first technology activity event.

In some embodiments, the system may determine an update to a system of records database system; and expunge the plurality of adapted hierarchical cache data objects 340 in real-time, in response to determining the update to a system of records database system. Moreover, the system transmits control signals to the application layer 201 to cause the application layer 201 and/or its relevant components (e.g., via relevant proactive processors 214*a*-214*c*) to perform periodic scans of storage locations or systems where user data or activity data is stored, such as the entity database 190, record (SOR) event data hub 270, the service layer 205, etc., to check for recent updates to the data and to determine data that is rendered incompatible and/or redundant in light of the recent updates, to determine obsolete cached data, and/or the like. Consequently, the system transmits control signals to the cache layer (e.g., associated with distributed cache database 260 of FIG. 2B), to cause it to (i) flush incompatible, redundant and obsolete data, and (ii) update relevant cache data objects accordingly (e.g., by only constructing new cache data objects for the specific fragments of updated data). In this regard, specifically, the system is structured to map adapted hierarchical cache data objects 340 to database storage columns (e.g., that of the entity database 190, record (SOR) event data hub 270, the service layer 205, etc.). Here, the cache layer flushes the incompatible, redundant and obsolete stored thereon by integrating the determined recent updates (and the determined incompatible, redundant and obsolete data) with the mapping of the adapted hierarchical cache data objects 340 to database storage columns. As an improvement provided by the present invention, the cache layer may selectively flush only relevant fragments of cached data, i.e., only relevant (to the determined updates) adapted hierarchical cache data objects of the plurality of the adapted hierarchical cache data objects 340, instead of undesirably flushing all of the cached data, or none of the cached data. Conventional systems store cached data in immense files, and are not capable of selectively flushing or updating specific fragments of data within the immense stored data. In this manner, the present invention keeps the cache layer lighter by removing incompatible, redundant and obsolete data objects and improves indexing on the cache layer. In some embodiments, the system may for each of the plurality of adapted hierarchical cache data objects 340 of each of the plurality of users, dynamically update the adapted hierarchical cache data object at a time interval preceding the associated determined time to fetch parameter.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent application:

| Docket Number | U.S. Pat. Application Ser. No. | Title | Filed On |
| --- | --- | --- | --- |
| 13121US1.014033.4337 | 17/849,634 | SYSTEMS AND METHODS FOR DYNAMIC MANAGEMENT OF STORED CACHE DATA BASED ON USAGE INFORMATION | Jun. 25, 2022 |

The invention claimed is:

1. A system for dynamic management of stored cache data based on predictive usage information, wherein the system is structured for proactive alleviation of obsolete data, dynamic pre-population and fetching of cached data based on determining actions preceding initiation of activities, for preventing data redundancy based errors, and reducing memory and processing burdens on data caching servers and reducing turnaround time for activity execution, the system comprising:
at least one memory device with computer-readable program code stored thereon;
at least one communication device;
at least one processing device operatively coupled to the at least one memory device and the at least one communication device, wherein executing the computer-readable program code is configured to cause the at least one processing device to:
detect, via a proactive processor application, a first access event via a first network device associated with a first communication channel at a first time interval, such that the first access event is detected prior to initiation of a first technology activity event by a first user;
determine a proactive technology activity event associated with the first user that is (i) compatible with the first network device associated with the first communication channel and (ii) matches the first access event;
determine a first adapted hierarchical cache data object of a plurality of adapted hierarchical cache data objects associated with the first user that is compatible with the proactive technology activity event;
trigger one or more data presence checks associated with the first adapted hierarchical cache data object at one or more technology network layers;
in response to a successful data presence check, selectively retrieve truncated cache data that matches the proactive technology activity event;
populate the first adapted hierarchical cache data object for use at a technology application associated with the first network device prior to the initiation of the first technology activity event by the first user;
detect initiation of the first technology activity event by the first user at a second time interval via the first network device associated with the first communication channel; and
in response to determining that the first technology activity event matches the proactive technology activity event, initiate the first technology activity event using the first adapted hierarchical cache data object.

2. The system of claim 1, wherein determining proactive technology activity event associated with the first user further comprises:
determine access attributes associated with the first access event;
retrieve, via a usage monitor engine application, metadata associated with prior technology usage events associated with the first user;
determine a first user access routine based on determining one or more usage patterns in the metadata associated with the prior technology usage events that match the access attributes associated with the first access event; and
determine a proactive technology activity event associated with the first user that is (i) compatible with the first network device associated with the first communication channel and (ii) matches the first user access routine.

3. The system of claim 1, wherein determining the first adapted hierarchical cache data object of the plurality of adapted hierarchical cache data objects further comprises:
determine one or more event attributes associated with the proactive technology activity event; and
determine the first adapted hierarchical cache data object of the plurality of adapted hierarchical cache data objects associated with the first user such that the first adapted hierarchical cache data object is compatible with the one or more event attributes of the proactive technology activity event.

4. The system of claim 1, wherein selectively retrieving truncated cache data comprises retrieving truncated cache data that matches one or more event attributes of the proactive technology activity event, further comprising:
retrieving the first adapted hierarchical cache data object of the plurality of adapted hierarchical cache data objects associated with the first user that is compatible with the one or more event attributes of the proactive technology activity event.

5. The system of claim 1, wherein executing the computer-readable program code is configured to cause the at least one processing device to:
trigger a first data presence check associated with the first adapted hierarchical cache data object at an application layer associated with the first communication channel.

6. The system of claim 5, wherein executing the computer-readable program code is configured to cause the at least one processing device to:
in response to a successful first data presence check, selectively retrieve truncated cache data that matches one or more event attributes of the proactive technology activity event, comprising selectively retrieving the first adapted hierarchical cache data object of the plurality of adapted hierarchical cache data objects associated with the first user such that the first adapted hierarchical cache data object is compatible with the one or more event attributes of the proactive technology activity event at a second time interval prior to initiation of the first technology activity event by the first user.

7. The system of claim 5, wherein executing the computer-readable program code is configured to cause the at least one processing device to:
in response to an unsuccessful first data presence check, trigger a second data presence check associated with the first adapted hierarchical cache data object at an entity layer associated with the first communication channel.

8. The system of claim 7, wherein executing the computer-readable program code is configured to cause the at least one processing device to:
in response to a successful second data presence check, selectively retrieve truncated cache data that matches one or more event attributes of the proactive technology activity event, comprising:
retrieving the first adapted hierarchical cache data object of the plurality of adapted hierarchical cache data objects associated with the first user that is compatible with the one or more event attributes of the proactive technology activity event prior to initiation of the first technology activity event by the first user; and
transmitting the retrieved first adapted hierarchical cache data object from the entity layer to the application layer prior to initiation of the first technology activity event by the first user.

9. The system of claim 1, wherein selectively retrieving truncated cache data, further comprises:
accessing the plurality of adapted hierarchical cache data objects associated with a plurality of users; and
indexing the plurality of adapted hierarchical cache data objects associated with the plurality of users based on a parent user identifier data element associated with the first user.

10. The system of claim 1, wherein populate the first adapted hierarchical cache data object for use at a technology application associated with the first network device prior to the initiation of the first technology activity event by the first user, further comprises:
determine a time latency associated with the proactive technology activity event, wherein determining the time latency comprises determining a time to fetch parameter associated with the first adapted hierarchical cache data object;
proactively extract, via a data caching application, the first adapted hierarchical cache data object at a predetermined first time interval preceding a second time associated with initiation of a second technology activity event, wherein the predetermined first time interval is associated with the determined time to fetch parameter associated with the time latency of the first technology activity event.

11. The system of claim 1, wherein executing the computer-readable program code is further configured to cause the at least one processing device to:
determine an update to a system of records database system; and
expunge the plurality of adapted hierarchical cache data objects in real-time, in response to determining the update to the system of records database system.

12. The system of claim 1, wherein executing the computer-readable program code is further configured to cause the at least one processing device to:
for each of a plurality of adapted hierarchical cache data objects of each of a plurality of users, dynamically update the adapted hierarchical cache data object at a time interval preceding an associated determined time to fetch parameter.

13. A computer program product for dynamic management of stored cache data based on predictive usage information, wherein the computer program product is structured for proactive alleviation of obsolete data, dynamic prepopulation and fetching of cached data based on determining actions preceding initiation of activities, for preventing data redundancy based errors, and reducing memory and processing burdens on data caching servers and reducing turnaround time for activity execution, the computer program product comprising a non-transitory computer-readable storage medium having computer-executable instructions to:
detect, via a proactive processor application, a first access event via a first network device associated with a first communication channel at a first time interval, such that the first access event is detected prior to initiation of a first technology activity event by a first user;
determine a proactive technology activity event associated with the first user that is (i) compatible with the first network device associated with the first communication channel and (ii) matches the first access event;
determine a first adapted hierarchical cache data object of a plurality of adapted hierarchical cache data objects associated with the first user that is compatible with the proactive technology activity event;
trigger one or more data presence checks associated with the first adapted hierarchical cache data object at one or more technology network layers;
in response to a successful data presence check, selectively retrieve truncated cache data that matches the proactive technology activity event;
populate the first adapted hierarchical cache data object for use at a technology application associated with the first network device prior to the initiation of the first technology activity event by the first user;

detect initiation of the first technology activity event by the first user at a second time interval via the first network device associated with the first communication channel; and in response to determining that the first technology activity event matches the proactive technology activity event, initiate the first technology activity event using the first adapted hierarchical cache data object.

14. The computer program product of claim 13, wherein determining proactive technology activity event associated with the first user further comprises:

determine access attributes associated with the first access event;

retrieve, via a usage monitor engine application, metadata associated with prior technology usage events associated with the first user;

determine a first user access routine based on determining one or more usage patterns in the metadata associated with the prior technology usage events that match the access attributes associated with the first access event; and determine a proactive technology activity event associated with the first user that is (i) compatible with the first network device associated with the first communication channel and (ii) matches the first user access routine.

15. The computer program product of claim 13, wherein determining the first adapted hierarchical cache data object of the plurality of adapted hierarchical cache data objects further comprises:

determine one or more event attributes associated with the proactive technology activity event; and determine the first adapted hierarchical cache data object of the plurality of adapted hierarchical cache data objects associated with the first user such that the first adapted hierarchical cache data object is compatible with the one or more event attributes of the proactive technology activity event.

16. The computer program product of claim 13, wherein the non-transitory computer-readable storage medium further comprises computer-executable instructions to:

trigger a first data presence check associated with the first adapted hierarchical cache data object at an application layer associated with the first communication channel; and in response to a successful first data presence check, selectively retrieve truncated cache data that matches one or more event attributes of the proactive technology activity event, comprising selectively retrieving the first adapted hierarchical cache data object of the plurality of adapted hierarchical cache data objects associated with the first user such that the first adapted hierarchical cache data object is compatible with the one or more event attributes associated with the proactive technology activity event at a second time interval prior to initiation of the first technology activity event by the first user.

17. A method dynamic management of stored cache data based on predictive usage information, wherein the method is structured for proactive alleviation of obsolete data, dynamic pre-population and fetching of cached data based on determining actions preceding initiation of activities, for preventing data redundancy based errors, and reducing memory and processing burdens on data caching servers and reducing turnaround time for activity execution, the method comprising:

detecting, via a proactive processor application, a first access event via a first network device associated with a first communication channel at a first time interval, such that the first access event is detected prior to initiation of a first technology activity event by a first user;

determining a proactive technology activity event associated with the first user that is (i) compatible with the first network device associated with the first communication channel and (ii) matches the first access event;

determining a first adapted hierarchical cache data object of a plurality of adapted hierarchical cache data objects associated with the first user that is compatible with the proactive technology activity event;

triggering one or more data presence checks associated with the first adapted hierarchical cache data object at one or more technology network layers;

in response to a successful data presence check, selectively retrieving truncated cache data that matches the proactive technology activity event;

populating the first adapted hierarchical cache data object for use at a technology application associated with the first network device prior to the initiation of the first technology activity event by the first user;

detecting initiation of the first technology activity event by the first user at a second time interval via the first network device associated with the first communication channel; and in response to determining that the first technology activity event matches the proactive technology activity event, initiating the first technology activity event using the first adapted hierarchical cache data object.

18. The method of claim 17, wherein determining proactive technology activity event associated with the first user further comprises:

determine access attributes associated with the first access event;

retrieve, via a usage monitor engine application, metadata associated with prior technology usage events associated with the first user;

determine a first user access routine based on determining one or more usage patterns in the metadata associated with the prior technology usage events that match the access attributes associated with the first access event; and determine a proactive technology activity event associated with the first user that is (i) compatible with the first network device associated with the first communication channel and (ii) matches the first user access routine.

19. The method of claim 17, determining the first adapted hierarchical cache data object of the plurality of adapted hierarchical cache data objects further comprises:

determine one or more event attributes associated with the proactive technology activity event; and determine the first adapted hierarchical cache data object of the plurality of adapted hierarchical cache data objects associated with the first user such that the first adapted hierarchical cache data object is compatible with the one or more event attributes of the proactive technology activity event.

20. The method of claim 17, wherein the method further comprises:

triggering a first data presence check associated with the first adapted hierarchical cache data object at an application layer associated with the first communication channel; and in response to a successful first data presence check, selectively retrieving truncated cache data that matches one or more event attributes of the proactive technology activity event, comprising selectively retrieving the first adapted hierarchical cache data object of the plurality of adapted hierarchical cache data objects associated with the first user such that the first adapted hierarchical cache data object is compatible with the one or more event attributes associated with the proactive technology activity event at a second time interval prior to initiation of the first technology activity event by the first user.

* * * * *